(12) United States Patent
Imamichi

(10) Patent No.: US 8,959,120 B2
(45) Date of Patent: Feb. 17, 2015

(54) INFORMATION PROCESSING APPARATUS, INFORMATION PROCESSING METHOD, AND FUNCTION EXPANSION PROGRAM

(75) Inventor: Takahiro Imamichi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1370 days.

(21) Appl. No.: 12/379,234

(22) Filed: Feb. 17, 2009

(65) Prior Publication Data

US 2009/0210859 A1 Aug. 20, 2009

(30) Foreign Application Priority Data

Feb. 18, 2008 (JP) .................................. 2008-036268
Oct. 23, 2008 (JP) .................................. 2008-273462

(51) Int. Cl.
| *G06F 7/00* | (2006.01) |
| *G06F 17/30* | (2006.01) |
| *G06F 9/445* | (2006.01) |
| *H04N 1/00* | (2006.01) |

(52) U.S. Cl.
CPC .............. *G06F 9/44526* (2013.01); *G06F 8/61* (2013.01); *G06F 8/62* (2013.01); *H04N 1/00941* (2013.01); *H04N 1/0097* (2013.01)
USPC ............................ 707/803; 717/168; 717/176

(58) Field of Classification Search
CPC ....... G06F 8/61; G06F 8/62; G06F 17/30345; G06F 17/30342; G06F 17/30297; G06F 17/30292
USPC .......... 707/705, 736, 790, 802, 803; 717/100, 717/120, 122, 174, 175, 176, 168
See application file for complete search history.

(56) References Cited

U.S. PATENT DOCUMENTS

| 5,870,759 | A | * | 2/1999 | Bauer et al. ................... 707/201 |
| 5,941,947 | A | * | 8/1999 | Brown et al. .................. 709/225 |
| 6,564,370 | B1 | * | 5/2003 | Hunt ............................. 717/122 |
| 6,978,260 | B2 | * | 12/2005 | Hack ................................. 707/1 |
| 7,047,212 | B1 | * | 5/2006 | Pych et al. ..................... 705/27.1 |
| 7,058,656 | B2 | * | 6/2006 | Winiger et al. ............... 707/103 |
| 2003/0154197 | A1 | * | 8/2003 | Millet et al. ....................... 707/9 |

(Continued)

FOREIGN PATENT DOCUMENTS

| JP | 2004-265061 A | 9/2004 |
| JP | 2005-094358 | 4/2005 |

(Continued)

*Primary Examiner* — Marc Somers
(74) *Attorney, Agent, or Firm* — Harness, Dickey & Pierce, P.L.C.

(57) ABSTRACT

Disclosed is an information processing apparatus provided with a software environment in which a function of the information processing apparatus is added and deleted by a plug-in and having a storage unit which stores, in a prescribed storage region, information that is composed of one or more attribute data and the function uses. The apparatus includes an information generation unit that has registration information in which a software component for constructing/deleting the attribute data of the information that the function uses is installed and registered in the information processing apparatus in accordance with the plug-in, specifies the software component used when the information is generated based on the registration information, and executes the specified software component to generate the information that the function uses; and an information management unit that instructs the information generation unit to generate the information designated in accordance with a request for generating the information.

9 Claims, 41 Drawing Sheets

(56) References Cited

U.S. PATENT DOCUMENTS

| | | |
|---|---|---|
| 2003/0200223 A1* | 10/2003 | Hack ................................ 707/101 |
| 2004/0068516 A1* | 4/2004 | Lee et al. .................... 707/103 Y |
| 2004/0223182 A1 | 11/2004 | Minagawa |
| 2005/0188208 A1* | 8/2005 | Day et al. ........................ 713/182 |
| 2006/0137019 A1* | 6/2006 | Dettinger et al. ................ 726/27 |
| 2006/0242189 A1* | 10/2006 | Leetaru et al. ................ 707/102 |
| 2007/0188824 A1 | 8/2007 | Imamichi |
| 2007/0266121 A1* | 11/2007 | Saeed et al. .................... 709/220 |
| 2008/0040311 A1 | 2/2008 | Imamichi |
| 2008/0168441 A1 | 7/2008 | Imamichi |
| 2008/0180733 A1 | 7/2008 | Imamichi |
| 2008/0282065 A1 | 11/2008 | Imamichi |

FOREIGN PATENT DOCUMENTS

| | | |
|---|---|---|
| JP | 2006-260106 A | 9/2006 |
| JP | 2007-058658 | 3/2007 |
| JP | 2007-128365 | 5/2007 |

* cited by examiner

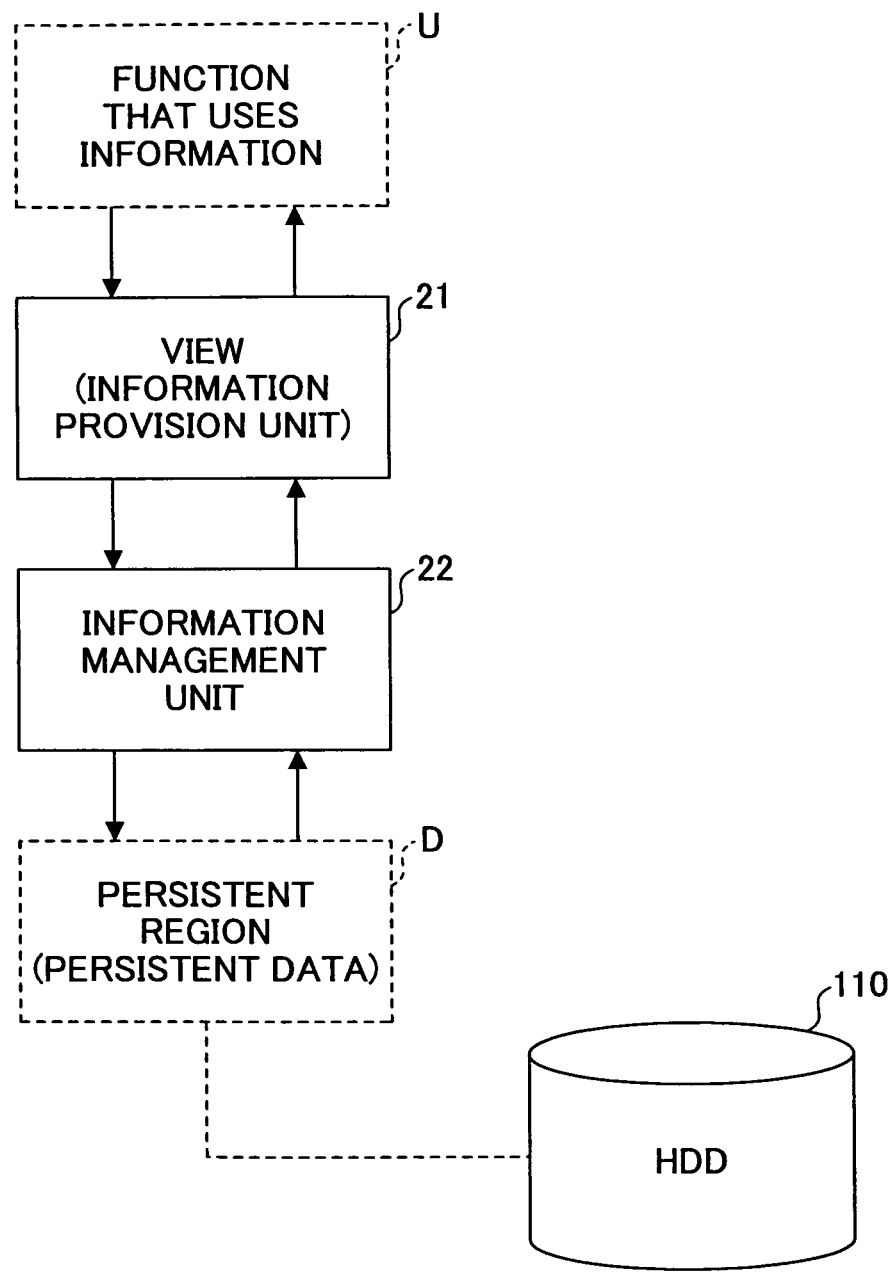

ORIGINAL PERSISTENT DATA          D

| ID | USER NAME | GENDER |
|---|---|---|
| usr001 | TANAKA | M |
| usr002 | SUZUKI | W |

| ID | USER NAME | GENDER | FAX NUMBER |
|---|---|---|---|
| usr001 | TANAKA | M | |
| usr002 | SUZUKI | W | |

FIG.3B

| ID | USER NAME | GENDER | FAX NUMBER |
|---|---|---|---|
| usr001 | TANAKA | M | |
| usr002 | SUZUKI | W | |
| usr003 | YAMAMOTO | W | 03-XXXX-0123 |

FIG.3C

| ID | USER NAME | GENDER | FAX NUMBER |
|---|---|---|---|
| usr001 | TANAKA | M | 06-XXXX-0123 |
| usr002 | SUZUKI | W | |
| usr003 | YAMAMOTO | W | 03-XXXX-0123 |

ORIGINAL PERSISTENT DATA          D

| ID | USER NAME | GENDER |
|---|---|---|
| usr001 | TANAKA | M |
| usr002 | SUZUKI | W |

| ID | USER NAME | GENDER |
|---|---|---|
| usr001 | TANAKA | M |
| usr002 | SUZUKI | W |

FIG.4B

| ID | USER NAME | GENDER |
|---|---|---|
| usr001 | TANAKA | M |
| usr002 | SUZUKI | W |
| usr003 | YAMAMOTO | |

FIG.4C

| ID | USER NAME | GENDER |
|---|---|---|
| usr001 | TANAKA | |
| usr002 | SUZUKI | W |
| usr003 | YAMAMOTO | |

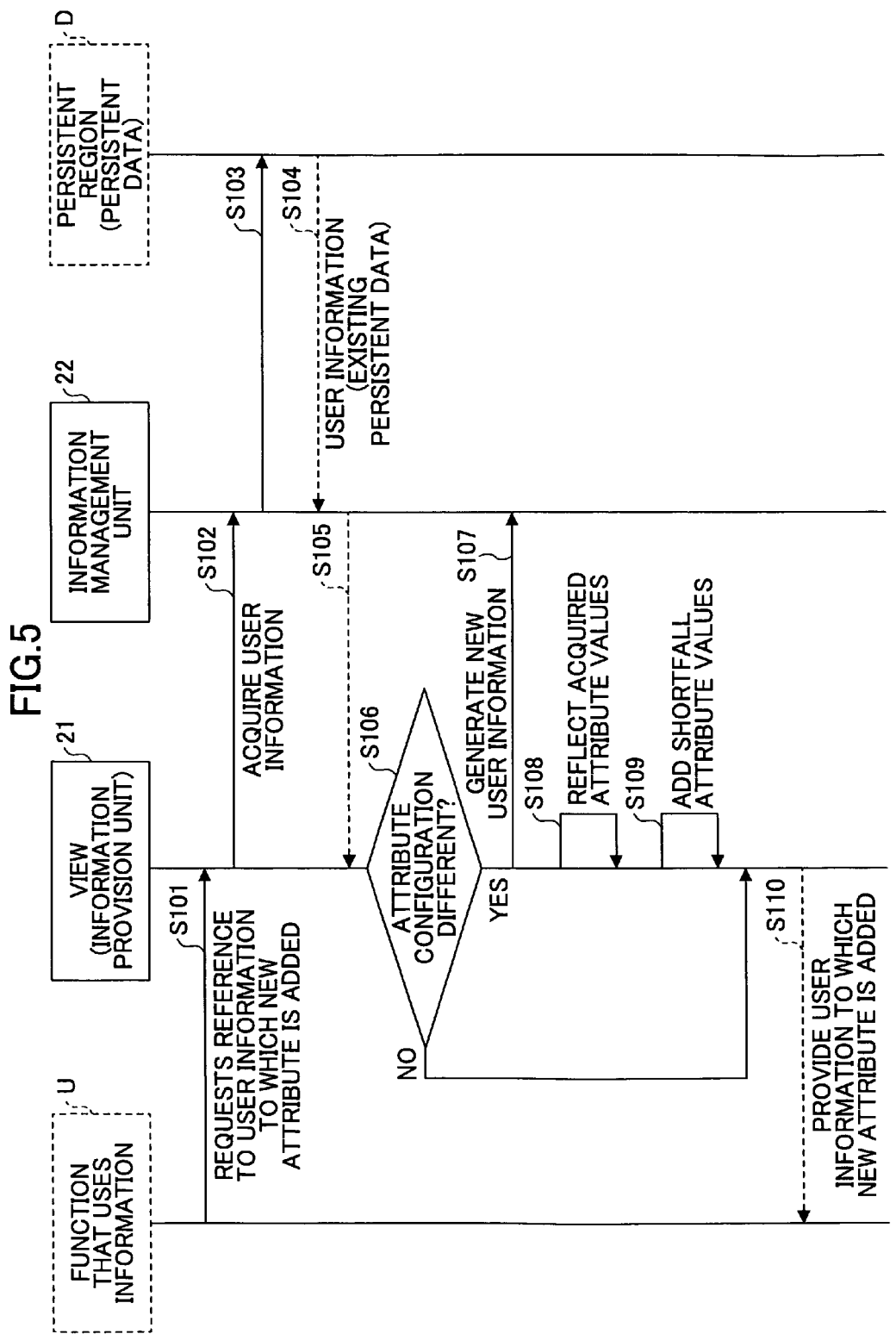

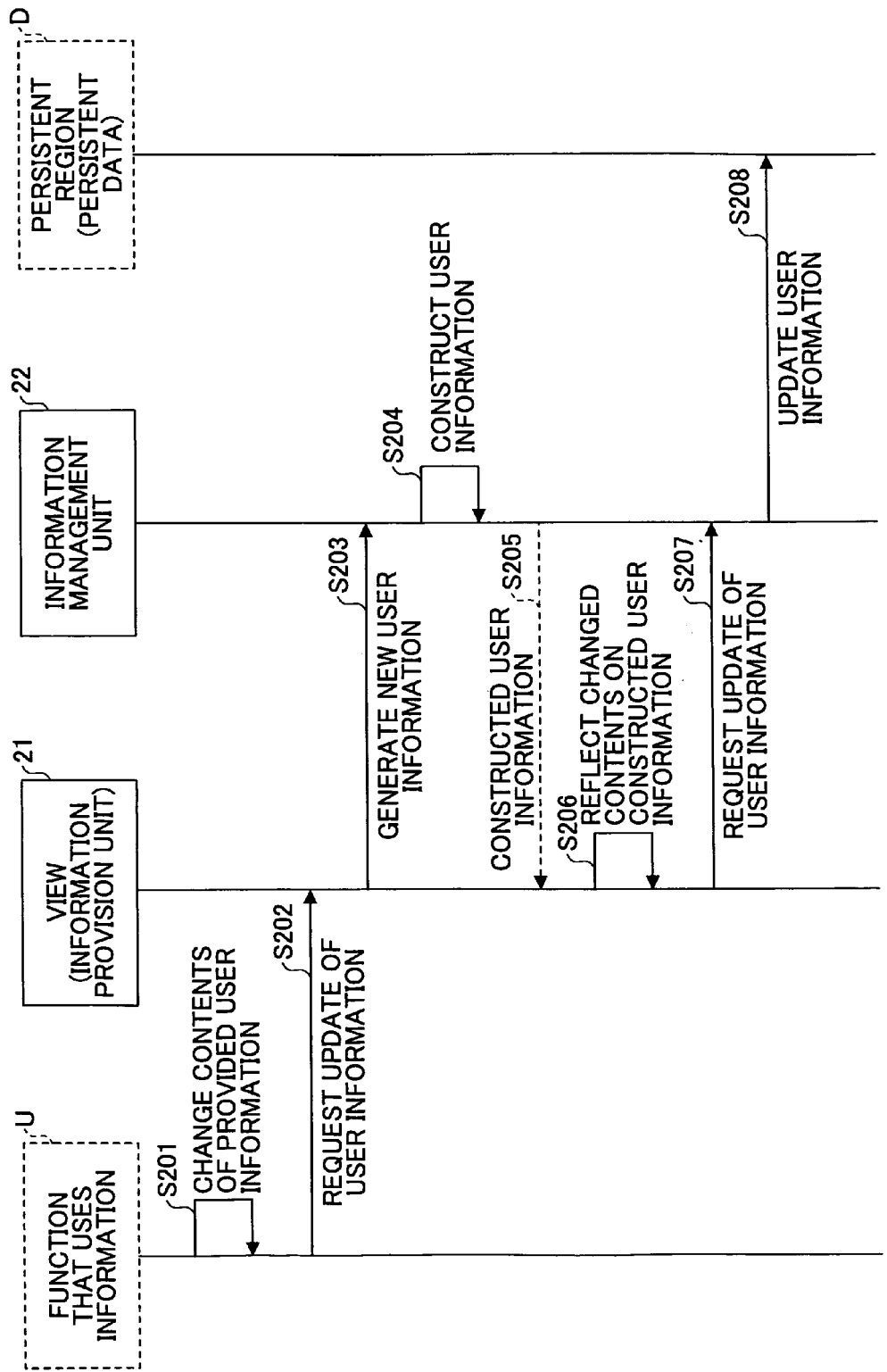

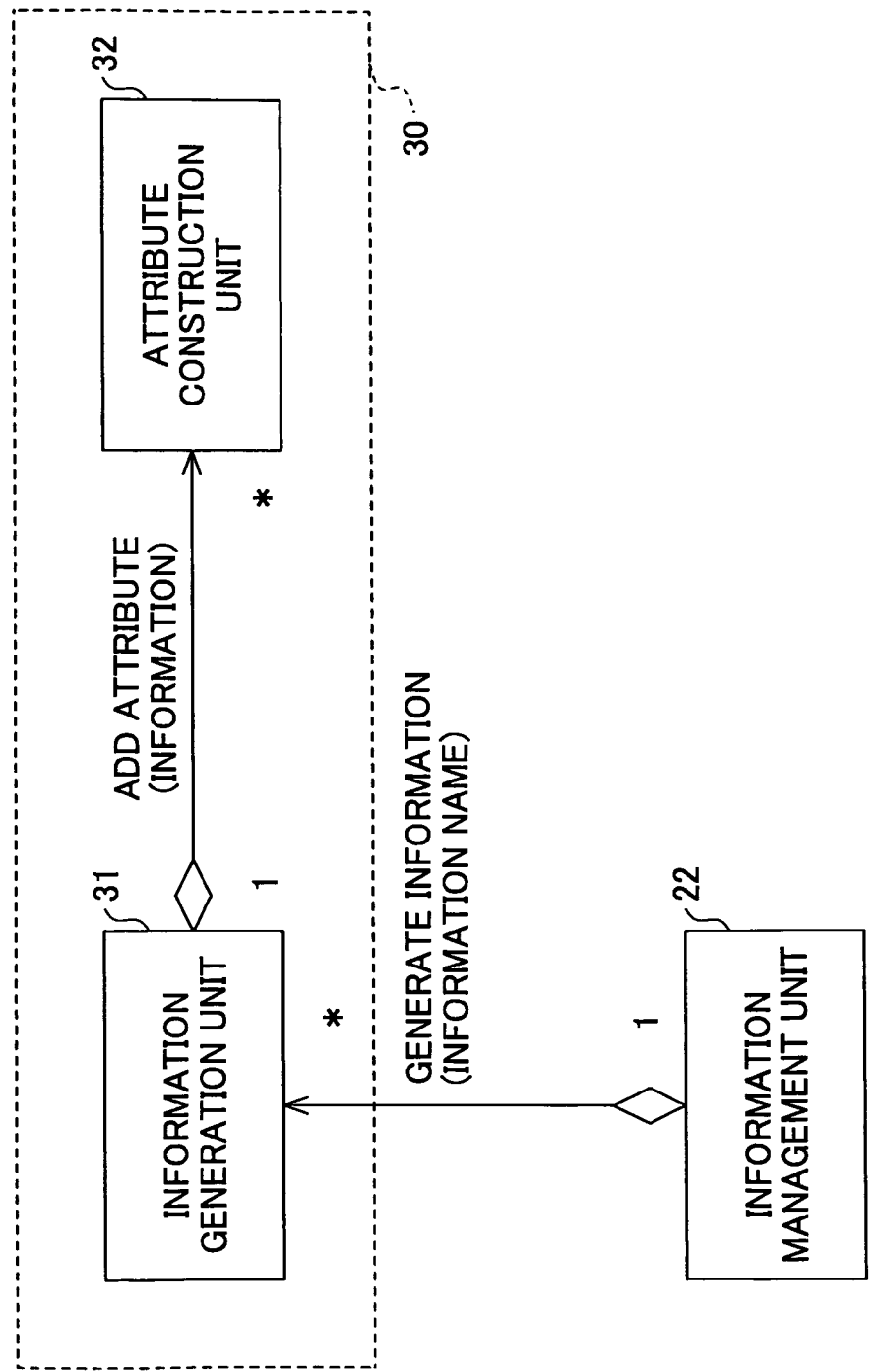

FIG.8A

PLUG-IN

| DATA ITEM | VALUE |
|---|---|
| PLUG-IN ID | 0001 |
| PLUG-IN NAME | FAX |
| DEPENDENCE INFORMATION NAME | USER INFORMATION ... |
| ATTRIBUTE CONSTRUCTION NAME | FAX ATTRIBUTE CONSTRUCTION UNIT |

FIG.8B

INFORMATION MANAGEMENT UNIT

| DATA ITEM | VALUE |
|---|---|
| HANDLED INFORMATION NAME | USER INFORMATION BIBLIOGRAPHIC INFORMATION ... |
| LINK TO INFORMATION GENERATION UNIT (LIST OF GENERATION UNITS) | USER INFORMATION GENERATION UNIT BIBLIOGRAPHIC INFORMATION GENERATION UNIT ... |

FIG.8C

INFORMATION GENERATION UNIT

| DATA ITEM | VALUE |
|---|---|
| GENERATED INFORMATION NAME | USER INFORMATION |
| LINK TO ATTRIBUTE CONSTRUCTION UNIT (LIST OF CONSTRUCTION UNITS) | BASIC ATTRIBUTE CONSTRUCTION UNIT AUTHENTICATION ATTRIBUTE CONSTRUCTION UNIT FAX ATTRIBUTE CONSTRUCTION UNIT ... |

FIG.8D

ATTRIBUTE CONSTRUCTION UNIT

| DATA ITEM | VALUE |
|---|---|
| CONSTRUCTED ATTRIBUTE NAME | FAX ATTRIBUTE |
| ADDED ATTRIBUTE (DEFAULT AND RULE) | FAX NUMBER (DEFAULT:—) (LIMITATION OF CHARACTER NUMBER:13) |

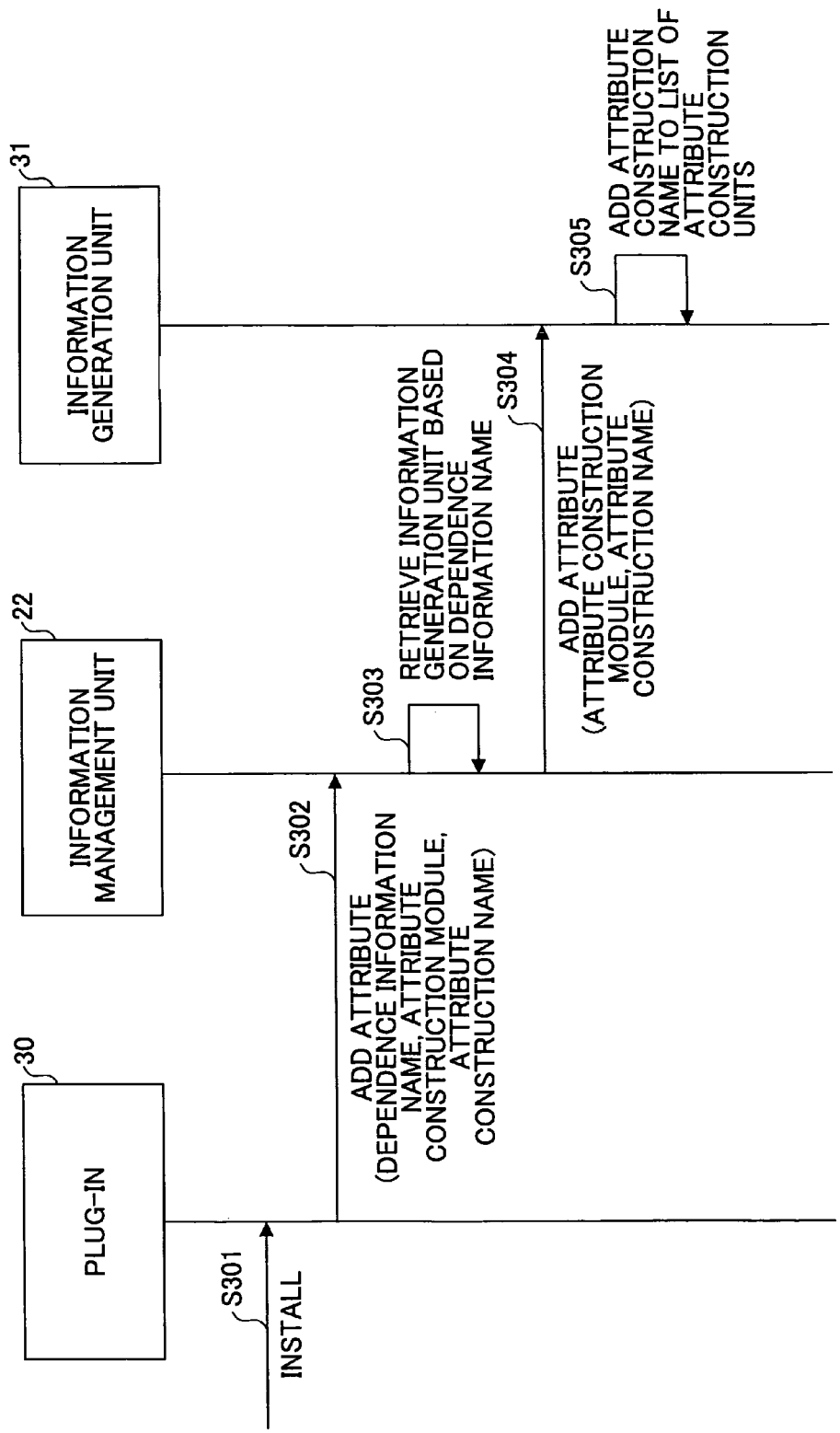

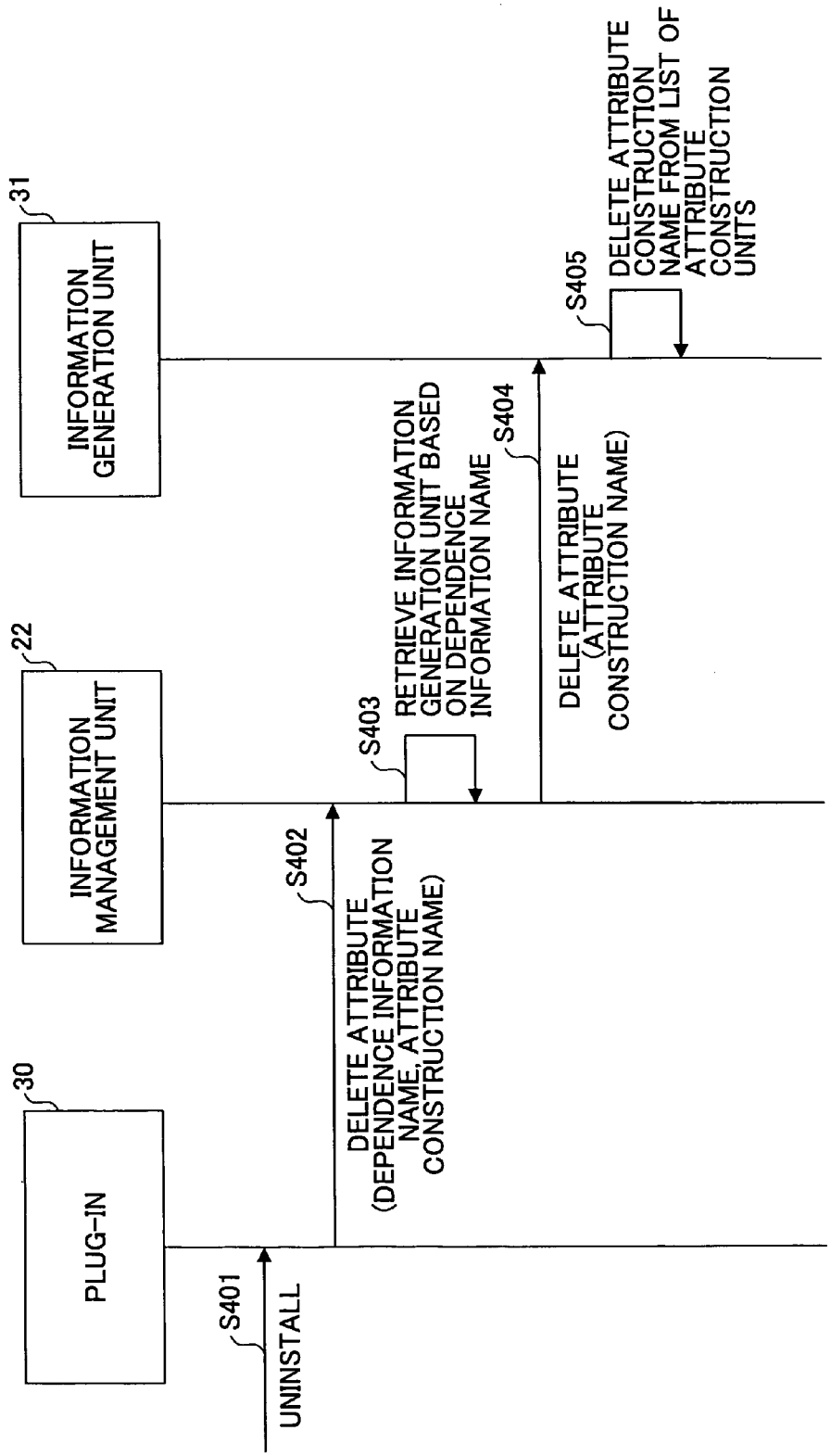

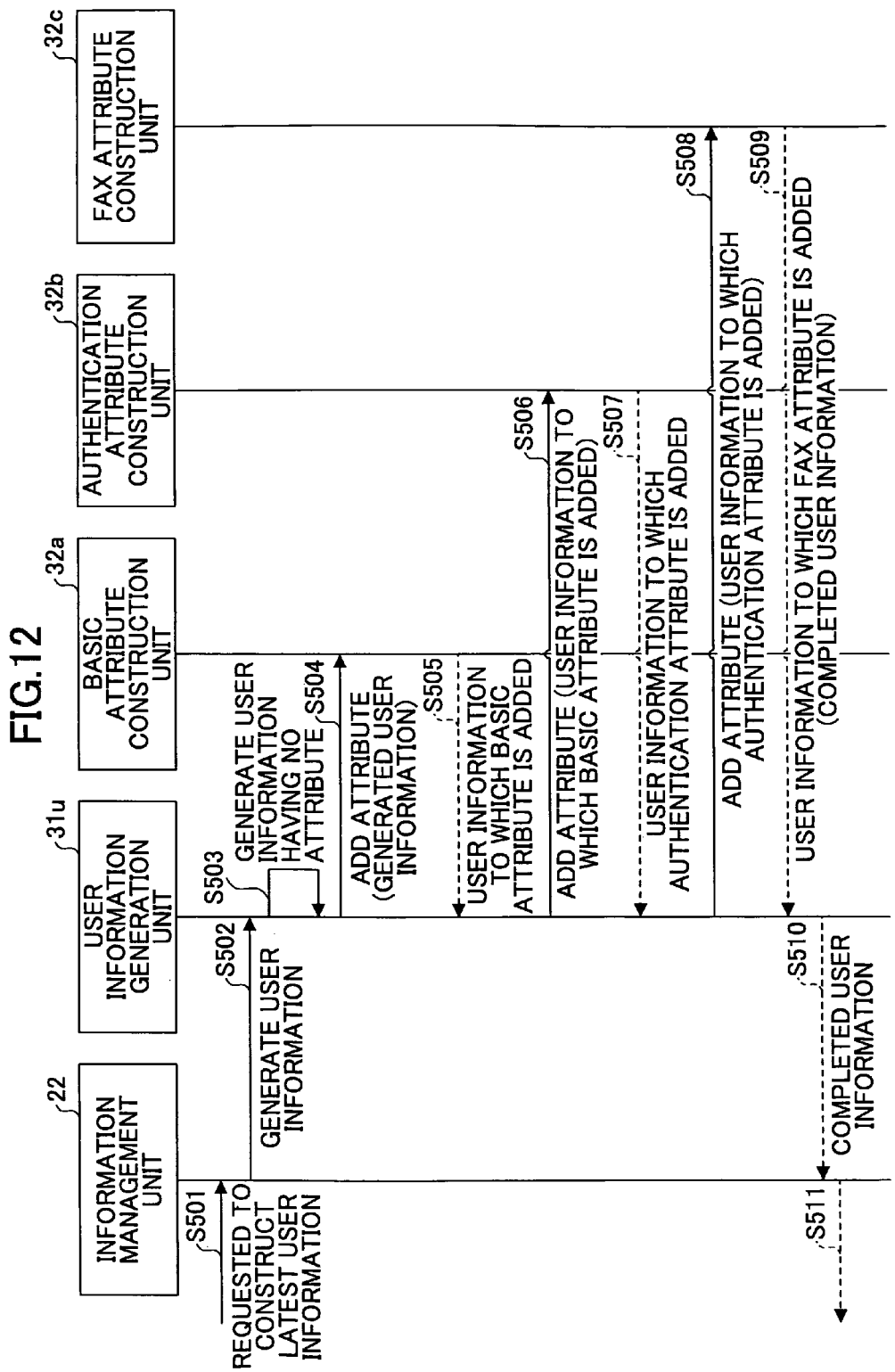

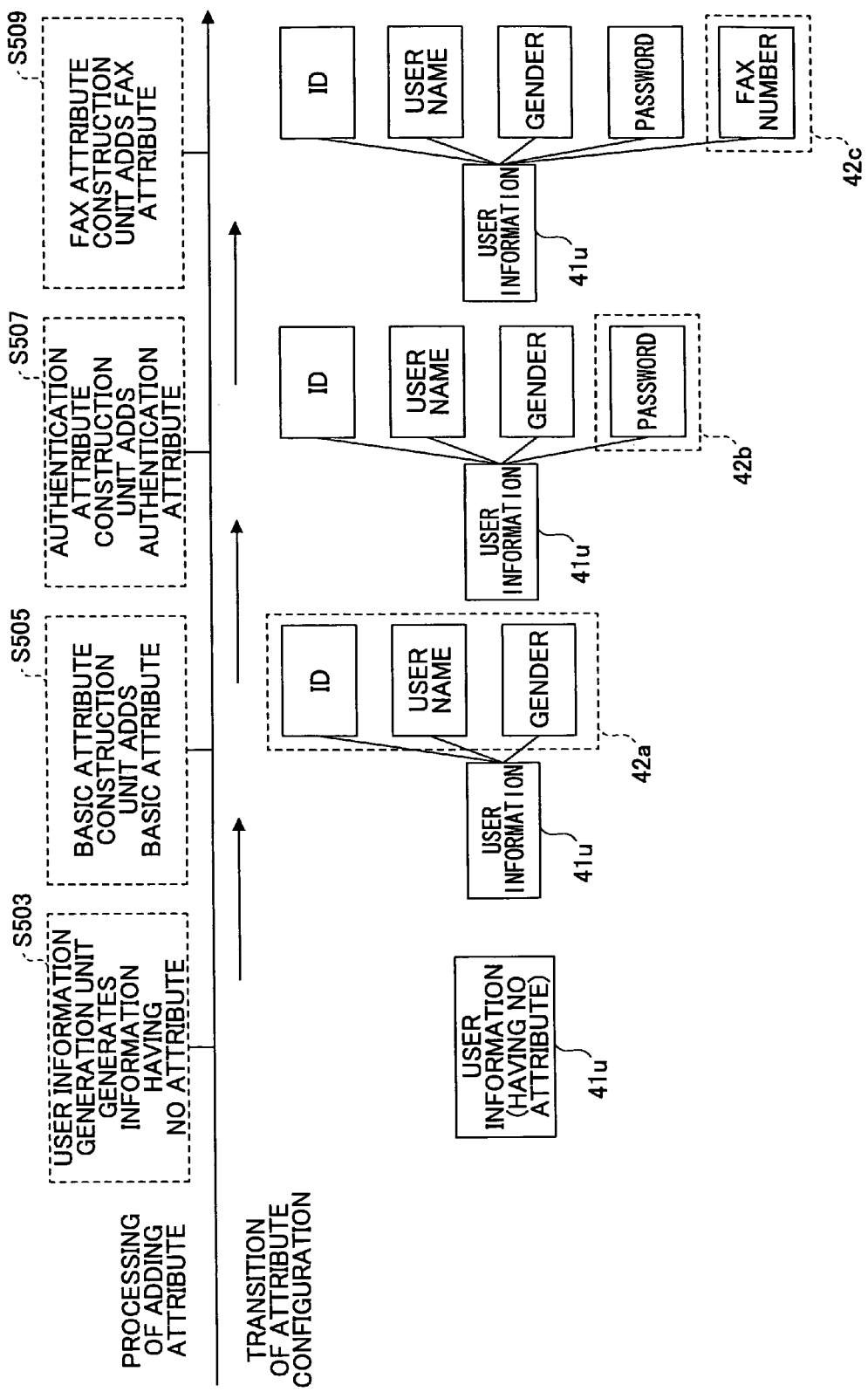

ADD PLUG-IN?
PLUG-IN NAME:FAX

| OK | CANCEL |

D

| ID | USER NAME | GENDER |
|---|---|---|
| usr001 | TANAKA | M |
| usr002 | SUZUKI | W |

| ID | USER NAME | GENDER | FAX NUMBER |
|---|---|---|---|
| usr001 | TANAKA | M | |
| usr002 | SUZUKI | W | |

FAX HAS BEEN PLUGGED IN

"FAX NUMBER" HAS BEEN ADDED TO USER INFORMATION

CHANGE CONTENTS: DETAILS OF "TANAKA"
ID: 0001
USER NAME: TANAKA
GENDER: M
FAX NUMBER: 06-XXXX-0123

OK

D

| ID | USER NAME | GENDER | FAX NUMBER |
|---|---|---|---|
| usr001 | TANAKA | M | |
| usr002 | SUZUKI | W | |

FIG.16A

| ID | USER NAME | GENDER | FAX NUMBER |
|---|---|---|---|
| usr001 | TANAKA | M | 06-XXXX-0123 |
| usr002 | SUZUKI | W | |

D

INFORMATION OF USER "TANAKA" HAS BEEN UPDATED

CHANGE CONTENTS: DETAILS OF "TANAKA"
ID: 0001
USER NAME: TANAKA
GENDER: M
FAX NUMBER: 06-XXXX-0123   [CHANGE]

| ID | USER NAME | GENDER | FAX NUMBER |
|---|---|---|---|
| usr001 | TANAKA | M | 06-XXXX-0123 |
| usr002 | SUZUKI | W | |

|  | APPARATUS 100α | APPARATUS 100β |
|---|---|---|
| CHARACTER LENGTH | 63 | 255 |
| CHARACTER CODE | Unicode | Shift-JIS |
| FORBIDDEN CHARACTER | REGULAR EXPRESSION SYMBOL | ·REGULAR EXPRESSION SYMBOL<br>·SMALL LETTER |

FIG.20B

| FIXATION FIELD | | | VARIABLE FIELD | |
|---|---|---|---|---|
| ATTRIBUTE NAME | LOCAL FLAG | TYPE | VERSION | MAXIMUM NUMBER |
| USER NAME | OFF(0) | CHARACTER STRING | 1.0 | 20 |
| GENDER | OFF(0) | CHARACTER STRING | 1.0 | 10 |
| ELECTRONIC MAIL ADDRESS | ON(1) | CHARACTER STRING | 2.0 | 128 |

FIG.24A

APPARATUS 100α

LOGIN

ID: 0001
PASSWORD: ****
LOGIN DESTINATION: APPARATUS 100β

LOGIN

FIG.24B

APPARATUS 100α → APPARATUS 100β

MAIN MENU

USER INFORMATION EDITION

LOGOUT

FIG.24C

USER INFORMATION EDITION

LIST OF USERS

| USER NAME | GENDER | ELECTRONIC MAIL ADDRESS |
|---|---|---|
| TANAKA | M | tanaka@abc.com |
| SUZUKI | W | suzuki@abc.com |

EDIT

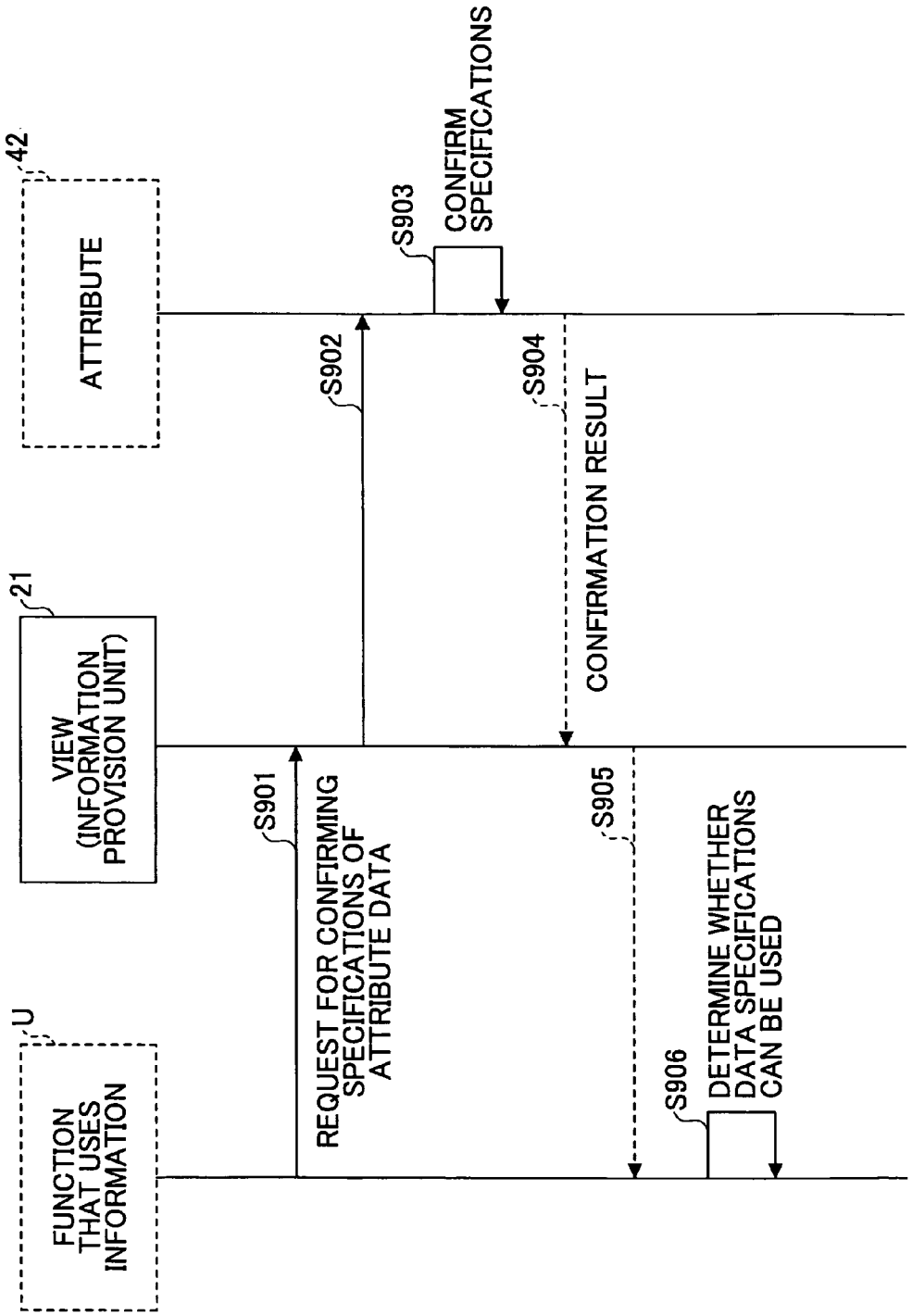

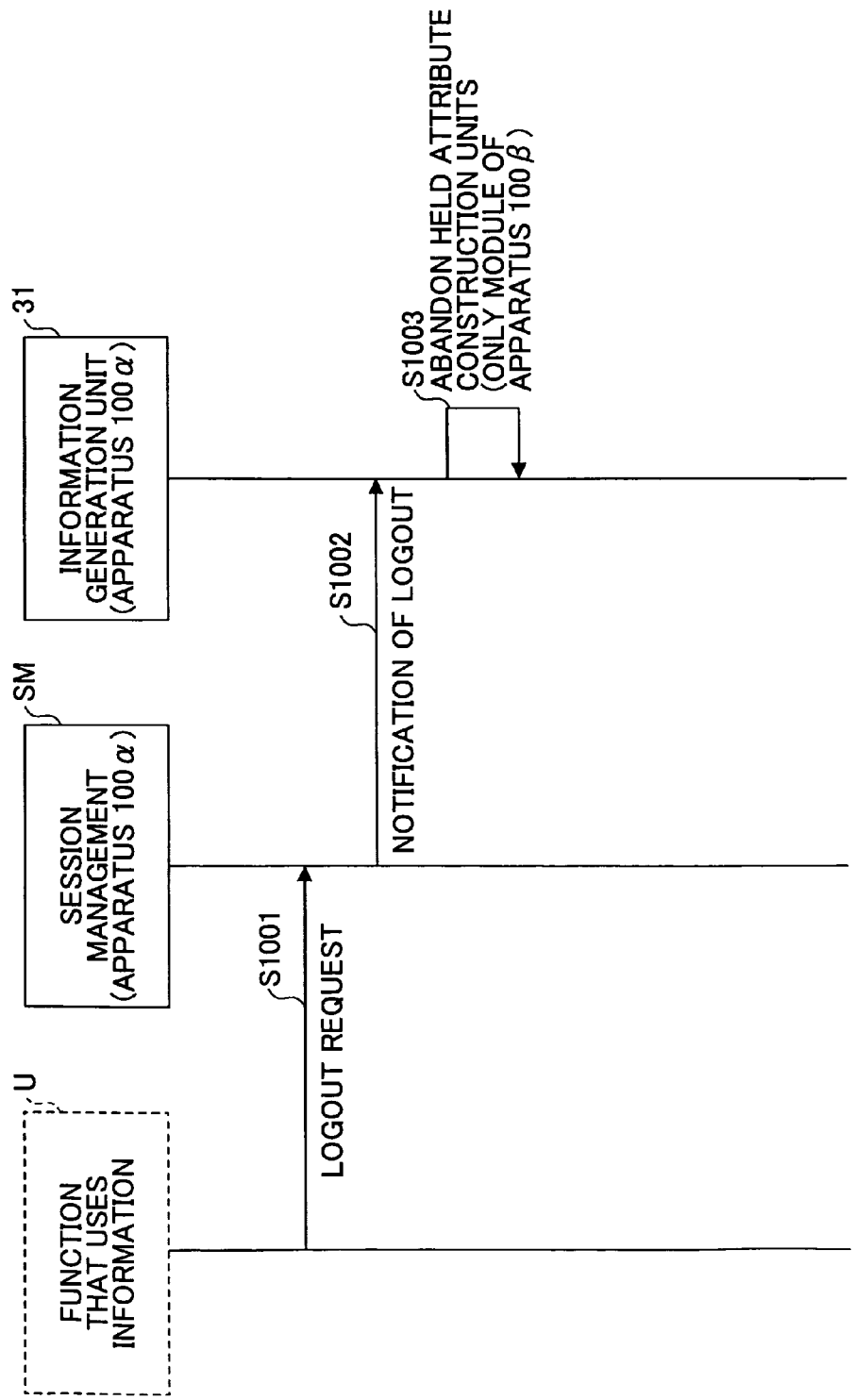

FIG.28

INFORMATION GENERATION UNIT

| DATA ITEM | VALUE |
|---|---|
| GENERATED INFORMATION NAME | USER INFORMATION |
| LINK TO ATTRIBUTE CONSTRUCTION UNIT (LIST OF CONSTRUCTION UNITS) | BASIC ATTRIBUTE CONSTRUCTION UNIT AUTHENTICATION ATTRIBUTE CONSTRUCTION UNIT FAX ATTRIBUTE CONSTRUCTION UNIT ... |
| CATEGORY DEFINITION | BASIC: ID, USER NAME, GENDER, PASSWORD FAX: FAX NUMBER, COMMUNICATIONS STANDARD ... |

FIG.29B

| CATEGORY | ATTRIBUTE NAME | DEFAULT | |
|---|---|---|---|
| BASIC | ID | (BLANK) | 41u |
| | USER NAME | (BLANK) | |
| | GENDER | UNKNOWN | |
| | PASSWORD | (BLANK) | |
| FAX | FAX NUMBER | 03-XXXX-XXXX | |
| | COMMUNICATIONS STANDARD | G3 | |

43

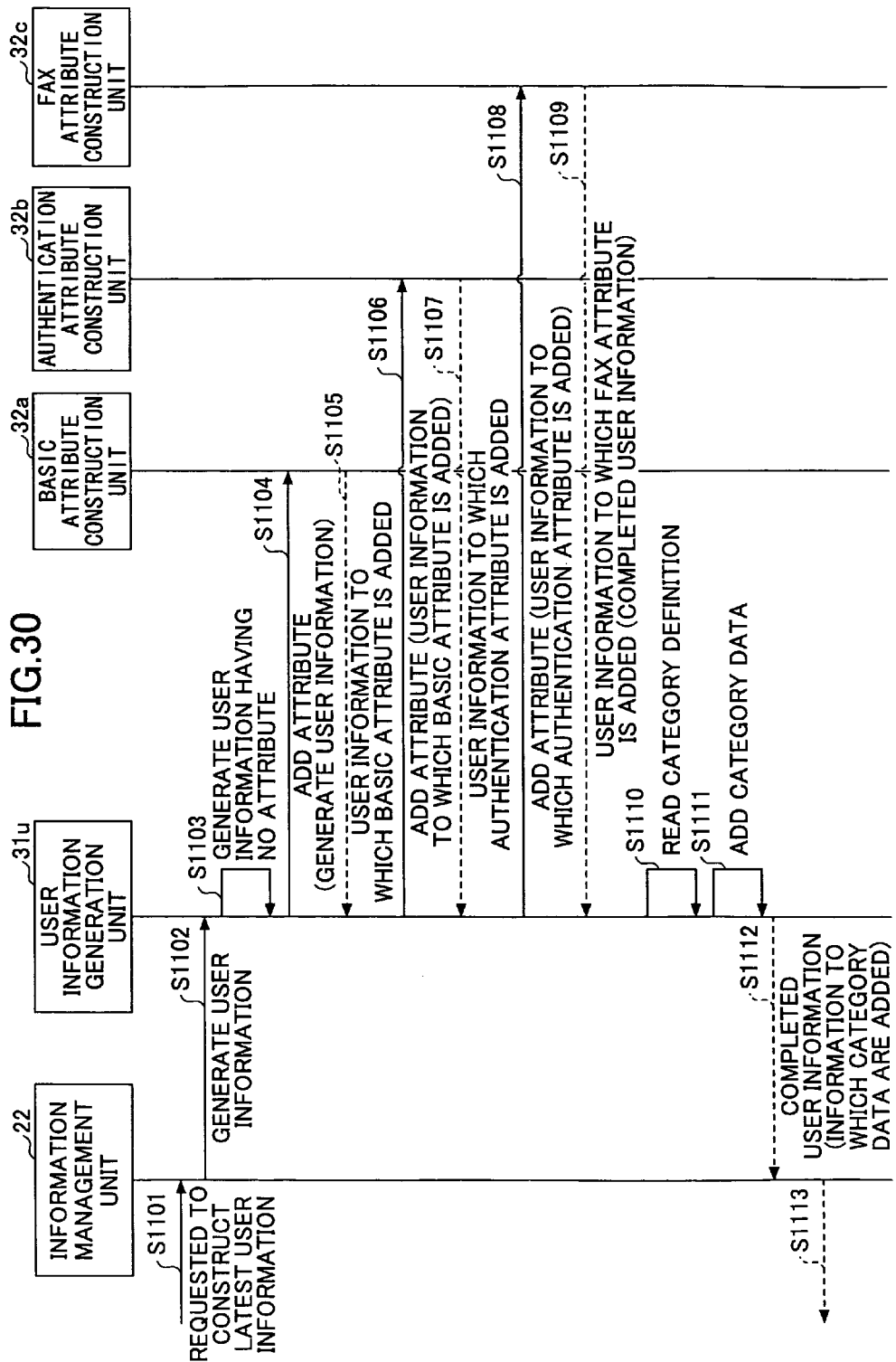

INFORMATION PROCESSING APPARATUS, INFORMATION PROCESSING METHOD, AND FUNCTION EXPANSION PROGRAM

BACKGROUND OF THE INVENTION

1. Field of the Invention

The present invention relates to information processing apparatuses that expand functions by installing/uninstalling a plug-in and, in particular, to technologies in which information added/deleted in accordance with the expansion of functions is managed.

2. Description of the Related Art

In recent years and continuing to the present, apparatuses (i.e., information processing apparatuses) such as management servers and MFPs (Multifunction Peripherals) shared by plural users manage and operate all sorts of information so as to provide the users with prescribed services. The information is constituted of one or more attribute data and organized into a unit having a prescribed meaning.

Here, it is important how the information is added to and deleted from the apparatus. Valid and invalid information are caused to be present in accordance with an increase and decrease in the functions of the apparatus. The efficient handling of the valid and invalid information greatly influences the information processing ability of the apparatus.

For example, in a case in which attribute data are simply added to all sorts of target information so as to add information to the apparatus, all the target information must be updated. Therefore, if there are so many target information items to be handled, the processing performance of the apparatus may be reduced. Furthermore, when temporarily-unused data and data containing significant information are taken into consideration in a case in which target attribute data are simply deleted so as to delete information from the apparatus, users may suffer disadvantages.

In view of this problem, Patent Document 1 has proposed an information processing technology in which defined attributes are made valid/invalid to perform the addition/deletion of the attributes in a pseudo manner.

The information processing technology disclosed in Patent Document 1 can provide a configuration capable of minimizing influences on a processing ability because data are not written in and deleted from a storage device such as a HDD (Hard Disk Drive) when attribute data are added/deleted. In addition, losing significant data can be prevented because the data are not explicitly deleted from the storage device. In the case of this information processing technology, however, all sorts of information managed and operated by the apparatus must be determined in advance, and information that users may use must be provided in advance. In other words, even uncertain information as to the use by users must be provided in the apparatus, which in turn wastes a region (persistent region) for storing the information.

Furthermore, when the information of the apparatus is used, it is not necessarily managed in a unit that users want. In this case, users must organize separately-managed attribute data into one piece of information in the apparatus.

In view of this problem, Patent Document 2 has proposed an information processing technology in which additional attribute data in a selected and instructed item are expanded in accordance with a request for referring to an information reference when the additional attribute data are displayed together with basic attribute data constituting the target reference information.

Patent Document 1: JP-A-2007-128365
Patent Document 2: JP-A-2007-058658

However, in the conventional information processing technologies disclosed in Patent Documents 1 and 2, the management and operations of the information of the apparatus shared by the users and respective functions is not satisfactorily considered.

The apparatus shared as described above must provide a circumstance for flexibly expanding functions. The expansion of the functions is performed in such a manner that a software component (hereinafter referred to as a "plug-in") for expanding the functions developed by a software vender is installed/uninstalled.

The information managed and operated by the apparatus is also contained in the plug-in. Accordingly, when the plug-in is installed in the apparatus, the information is introduced in the apparatus.

For this reason, in the information processing technologies described above, when the plug-in provided by a third vendor is installed in the apparatus, it is not possible to assume what information is (attribute data are) added to the apparatus. Therefore, the information processing technologies cannot flexibly deal with an increase and decrease in information.

Accordingly, it is necessary to provide a configuration capable of dynamically increasing and decreasing attribute data in consideration of an increase and decrease in information.

Furthermore, in order to add/delete attribute data to/from all sorts of information handled in the apparatus, a software component is present.

Therefore, it is necessary to change the software component that performs processing on data operation such as addition/deletion of attribute data.

SUMMARY OF THE INVENTION

The present invention has been made in view of the above problems and may provide an information processing apparatus, an information processing method, and a function expansion program (plug-in) capable of flexibly dealing with an increase and decrease in attribute data constituting all sorts of information handled in the apparatus caused by the expansion of a function without changing the software components of the apparatus.

According to an aspect of the present invention, there is provided an information processing apparatus provided with a software environment in which the function of the information processing apparatus is added and deleted by a plug-in and having a storage unit which stores, in a prescribed storage region, information that is composed of one or more attribute data and the function uses. The information processing apparatus includes an information generation unit that has registration information in which a software component for constructing/deleting the attribute data of the information that the function uses is installed and registered in the information processing apparatus in accordance with the plug-in, specifies the software component used when the information is generated based on the registration information, and executes the specified software component to generate the information that the function uses; and an information management unit that instructs the information generation unit to generate the information designated in accordance with a request for generating the information.

With this configuration, the information processing apparatus according to an embodiment of the present invention has a configuration in which an attribute construction unit (attribute construction module), which performs data operations such as addition/deletion/change of attribute data, is added in and deleted from the apparatus in accordance with the installation/uninstallation of the plug-in that performs the function expansion. Specifically, the information generation unit specifies the attribute construction unit that performs the data operations of the designated attribute data from among the installed attribute construction units based on the list of the construction units as control data, which is registered at the time of installation. As a result, the data operations of the attribute data are performed by the specified attribute construction unit. Moreover, in the data operations, instead of accessing a persistent region such as a HDD and directly operating data, information to be operated is first generated on a memory and the data of the generated information are operated, thereby adding/deleting/changing the attribute data in a pseudo manner.

According to the embodiment of the present invention, it is possible to provide an information processing apparatus, an information processing method, and a function expansion program (plug-in) capable of flexibly dealing with an increase and decrease in attribute data constituting all sorts of information handled in the apparatus caused by the expansion of a function without changing the software component of the apparatus.

Other objects, features and advantages of the present invention will become more apparent from the following detailed description when read in conjunction with the accompanying drawings.

BRIEF DESCRIPTION OF THE DRAWINGS

FIG. 2 is a diagram showing an example of the function configuration of an information processing function according to the first embodiment of the present invention;

FIGS. 3A through 3C are diagrams showing an example of an operation for adding attribute data according to the first embodiment of the present invention;

FIGS. 4A through 4C are diagrams showing an example of an operation of deleting attribute data according to the first embodiment of the present invention;

FIG. 5 is a diagram showing an example of a processing procedure for referring to existing information according to the first embodiment of the present invention;

FIG. 6 is a diagram showing an example of a processing procedure for updating existing information according to the first embodiment of the present invention;

FIG. 7 is a diagram showing an example of software components managed by an information management unit according to the first embodiment of the present invention;

FIGS. 8A through 8D are diagrams showing an example of the data configurations of the software components according to the first embodiment of the present invention;

FIG. 9 is a diagram showing an example of a processing procedure (installation procedure) for adding an attribute construction unit according to the first embodiment of the present invention;

FIG. 10 is a diagram showing an example of a processing procedure (uninstallation procedure) for deleting the attribute construction unit according to the first embodiment of the present invention;

FIG. 12 is a diagram showing an example of a processing procedure for adding attribute data to user information according to the first embodiment of the present invention;

FIG. 13 is a diagram showing an example of operations when attribute data are added to user information according to the first embodiment of the present invention;

FIGS. 14A and 14B are diagrams showing an example (part 1) of user operations when FAX attribute data are added to user information according to the first embodiment of the present invention;

FIGS. 15A and 15B are diagrams showing an example (part 2) of the user operations when the FAX attribute data are added to the user information according to the first embodiment of the present invention;

FIGS. 16A and 16B are diagrams showing an example (part 3) of the user operations when the FAX attribute data are added to the user information according to the first embodiment of the present invention;

FIGS. 20A and 20B are diagrams showing an example of software components managed by the information management unit according to the second embodiment of the present invention;

FIGS. 24A through 24C are diagrams showing an example (part 1) of operations when the use limitations in the cooperation between the apparatuses according to the second embodiment of the present invention occur;

FIG. 26 is a diagram showing an example (part 2) of a processing procedure for the use limitations in the cooperation between the apparatuses according to the second embodiment of the present invention;

FIG. 27 is a diagram showing an example of post-processing performed at logout time according to the second embodiment of the present invention;

FIG. 28 is a diagram showing an example of data configuration of an information generation unit according to a third embodiment of the present invention FIGS. 29A and 29B are diagrams showing a relationship between categories and attributes according to the third embodiment of the present invention;

FIG. 30 is a diagram showing an example of a processing procedure in which category data are added to user information according to the third embodiment of the present invention;

DETAILED DESCRIPTION OF THE PREFERRED EMBODIMENTS

Next, a preferred embodiment (hereinafter referred to as an "embodiment") of the present invention is described in detail with reference to the accompanying drawings.

First Embodiment (Hardware Configuration)

Figure 1:
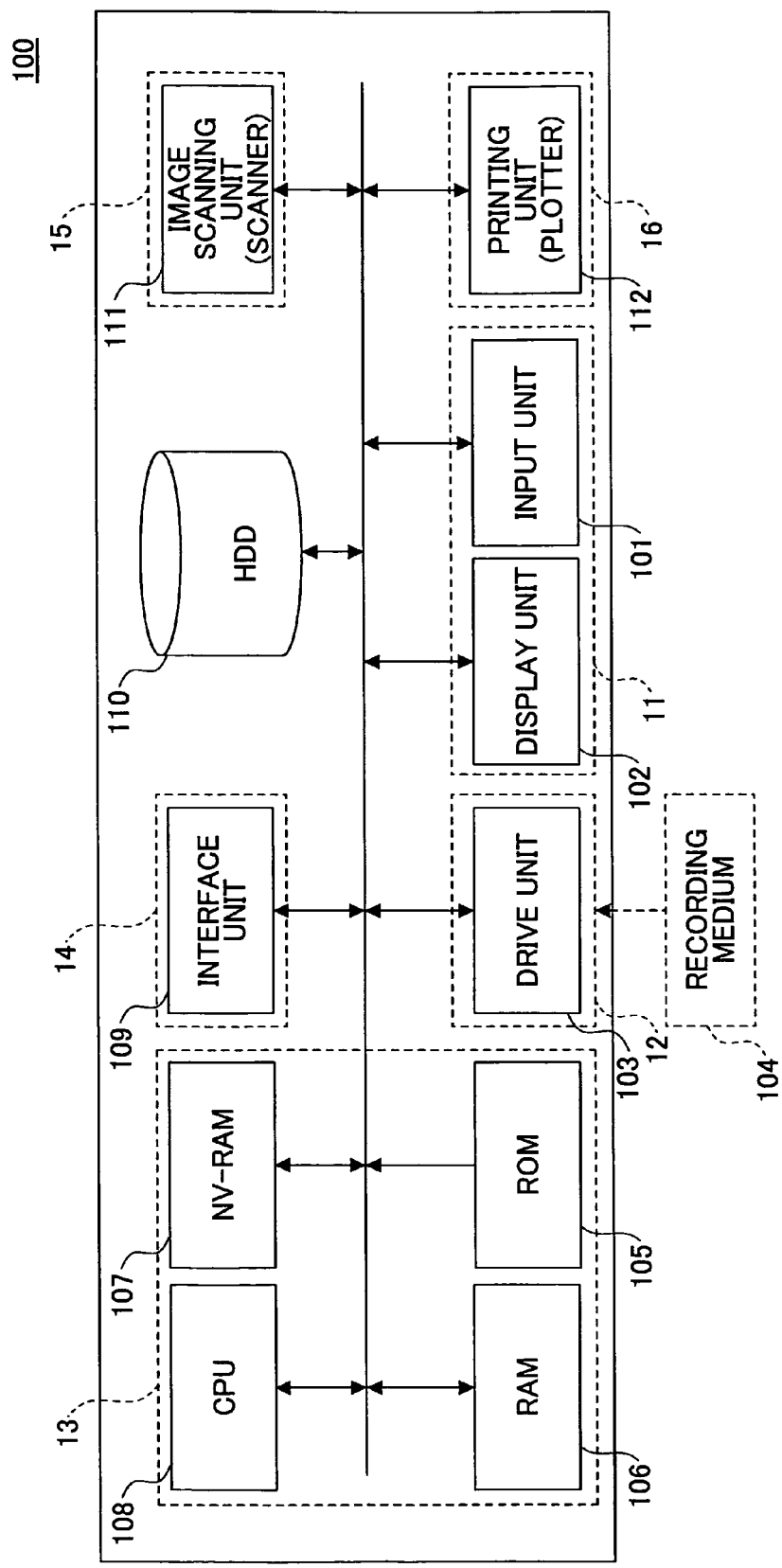
FIG. 1 is a diagram showing an example of the hardware configuration of an information processing apparatus according to a first embodiment of the present invention.

First, the hardware configuration of an apparatus shared by users is described based on FIG. 1. FIG. 1 is a block diagram showing an example of the hardware configuration of a multifunction peripheral 100.

The multifunction peripheral 100 according to this embodiment is composed of an operations panel 11, a storage medium interface (I/F) 12, a controller 13, a data communications I/F 14, a HDD 110, a scanner 15, and a plotter 16, all of which are connected to one another through a bus.

The operations panel 11 has an input unit 101 and a display unit 102. The input unit 101 is constituted by hardware keys or the like and used for inputting operation signals to the multifunction peripheral 100. The display unit 102 is constituted by a display or the like and displays all sorts of information related to image processing operations such as operating conditions.

The data communications I/F 14 has an interface unit 109 and serves as an interface for connecting the multifunction peripheral 100 to the data transmission path (not shown) of a network (data communications network) such as a LAN (Local Area Network) and a WAN (Wide Area Network) constructed by a wire and/or wireless line.

The HDD 110 stores all sorts of data such as receiving document data and read image data handled in the multifunction peripheral 100. In addition, the HDD 110 manages the data under a prescribed file system and a DB (DataBase).

The storage medium I/F 12 has a drive unit 103 and serves as an interface for connecting a recording medium 104 such as a flash memory to the multifunction peripheral 100. The storage medium I/F 12 allows data to be exchanged between the multifunction peripheral 100 and the recording medium 104. For example, the recording medium 104 is used when a plug-in or the like as a function expansion program is installed in the multifunction peripheral 100.

The controller 13 has a ROM (Read Only Memory) 105, a RAM (Random Access Memory) 106, a NV-RAM (Non-Volatile RAM) 107, and a CPU (Central Processing Unit) 108. The ROM 105 stores a program (OS that is a program serving as an operating system) and all sorts of data executed when the multifunction peripheral 100 is activated. In addition, the ROM 105 stores a program (application program) and all sorts of data for implementing the functions of the multifunction peripheral 100. The RAM 106 temporarily holds all sorts of programs and data read from the ROM 105 and the HDD 110. The NV-RAM 107 stores setting data related to the multifunction peripheral 100 such as an initial setting value (initial setting value related to image processing control) for controlling image processing operations. The CPU 108 executes a program that the RAM 106 temporarily holds. With the above configuration, when receiving printing data through the data communications I/F 14, the controller 13 causes the CPU 108 to execute a program (PDL parser) capable of interpreting a PDL (Page Description Language) read in the RAM 106 from the ROM 105 and interprets the printing data to generate a bit map image.

The scanner 15 has an image scanning unit 111 and optically scans a document placed on a scanning surface to generate scanning image data. The plotter 16 has a printing unit 112 and prints the bit map image transferred from the controller 13 on a recording sheet (printing sheet) with, for example, an electrophotographic method. Here, the electrophotographic method is exemplified as an example of an image forming method, but the embodiment of the present invention is not limited to this. For example, an ink jet method may be used.

As described above, in the multifunction peripheral 100 according to this embodiment, a prescribed program read in the RAM 106 of the controller 13 is executed by the CPU 108, and requested image processing is applied to data input through the respective interfaces of the multifunction peripheral 100.

(Information Processing Function)

The multifunction peripheral 100 manages and operates all sorts of information to provide the user with prescribed services. Next, a description is made of an information processing function for managing and operating data, which is performed by the multifunction peripheral 100 and capable of dynamically increasing and decreasing the attribute data of information handled in the apparatus. Furthermore, a description is made of an information processing apparatus 100 instead of the multifunction peripheral 100 because the information processing function of the multifunction peripheral 100 is described.

(Function Configuration for Implementing Information Processing Function)

FIG. 2 is a diagram showing an example of the function configuration of the information processing function according to the first embodiment of the present invention. The information processing apparatus 100 according to this embodiment has a view (information provision unit) 21 and an information management unit 22 as the main information processing functions. Furthermore, the information processing apparatus 100 provides the user who uses information (namely, the display screen of the operations panel 11) and respective functions (respective applications operating on the information processing apparatus 100) U with persistent data D (actual values of attribute data constituting information) of all sorts of information stored in the apparatus.

The view 21 is a function that receives a request for acquiring information or the like from the user who uses information and the respective functions and provides the request sources with only necessary information through the information management unit 22. Furthermore, the view 21 instructs the information management unit 22 to update information when receiving a request for updating information or the like. Furthermore, the view 21 determines a difference in an attribute configuration between information requested to be operated by the user who uses information and the respective functions and existing information acquired from the information management unit 22.

The information management unit 22 is a function that receives the request for acquiring information from the view 21, accesses a prescribed storage region (hereinafter referred to as a "persistent region"), such as the HDD 110 that is the non-volatile storage unit of the apparatus, based on designated information, and passes the acquired persistent data D to the view 21. Furthermore, the information management unit 22 accesses the persistent region and updates the persistent data D when receiving the request for updating information from the view 21. Furthermore, in accordance with instructions from the view 21, the information management unit 22 secures a storage region capable of storing respective attribute data constituting the latest information in the memory (RAM 106) to construct the attributes of the latest information.

The respective function units described above are software components and stored in the ROM 105 of the information processing apparatus 100. The function units are read in the RAM 106 and executed by the CPU 108. In this manner, the functions of the functions units are implemented.

(Example of Operating Attribute Data)

The information processing apparatus 100 according to this embodiment performs the following data operations with the function configuration described above. In this embodiment, when a function is added/deleted with the installation/uninstallation of a plug-in, persistent data are not updated in accordance with the function change, but are basically protected.

(Addition of Attribute Data)

Figure 3A:

FIGS. 3A through 3C are diagrams showing an example of the operation of adding attribute data according to the first embodiment of the present invention. FIG. 3A shows an example in which the attribute data of "FAX number" are newly added to the persistent data D of user information. As shown in FIG. 3A, at a time when the attribute data of "FAX number" are added, the originally persistent user information (data regions related to "usr001" and "usr002" of ID in FIG. 3A) of two persons remains the same.

However, as shown in FIG. 3B, the attribute of "FAX number" can be set for the information of a new user (data region related to "usr003" of ID in FIG. 3B) when it is registered. Therefore, at a time when the new user information is registered, the attribute data of "FAX number" is reflected.

Furthermore, as shown in FIG. 3C, when the information of the registered user (data region related to "usr001" of ID in FIG. 3C) is updated, the attribute of "FAX number" can be set for the registered user. Therefore, the attribute data of "FAX number" is reflected at this time. Even if the attribute data to be added are not explicitly set, a default is set to match the data.

As described above, the information processing apparatus 100 according to this embodiment does not reflect the addition of the new attribute data on persistent data D right after the new attribute data are added to the information handled in the apparatus. The information processing apparatus 100 actually reflects the addition of the new attribute data in the persistent data D at the time of changing the persistent data D such as a case in which the user who uses information and the respective functions U (hereinafter the user and the functions are integrally expressed as a "function that uses information" for the sake of convenience) update the information, thereby automatically matching the data.

(Deletion of Attribute Data)

Figure 4A:

FIGS. 4A and 4B are diagrams showing an example of the operation of deleting attribute data according to the first embodiment of the present invention. FIG. 4A shows an example in which the attribute data of "Gender" are deleted from the persistent data D of user information. As shown in a shaded area, the attribute data to be deleted are only handled as if they are absent. However, the attribute data are actually present in the apparatus.

Furthermore, as shown in FIG. 4B, the attribute of "Gender" cannot be set for the information of a new user (data region related to "usr003" of ID in FIG. 4B) when it is registered. Therefore, at a time when the new user information is registered, the attribute data of "Gender" are not generated.

Furthermore, as shown in FIG. 4C, when the information of the registered user (data region related to "usr001" of ID in FIG. 4C) is updated, the attribute of "Gender" remains because the attribute of "Gender" of the registered user cannot be deleted. In this case, in a case in which the gender of the registered user whose registered ID is "usr001" is changed from "M (male)" to "F (female)," the data cannot be matched to each other. Therefore, the information processing apparatus 100 is so designed as to explicitly provide a deletion instruction when the registered information is updated. In this manner, the information processing apparatus 100 deletes the attribute data to be deleted from a corresponding data region when receiving a request for deleting the attribute data.

As described above, as in the case of the addition of the attribute data, the information processing apparatus 100 according to this embodiment does not reflect the deletion of the attribute data right after the attribute data are deleted from the information handled in the apparatus. In view of data protection, the information processing apparatus 100 actually reflects the deletion of the attribute data on the persistent data when receiving the deletion instruction at the time of accessing the persistent data D such as a case in which the function U refers to and updates the information, thereby matching the data.

(Example of Operating Existing Information (Persistent Data))

Next, a description is specifically made of what processing procedure the information processing apparatus 100 according to this embodiment follows in order to perform the above data operations.

(Reference to Existing Information)

FIG. 5 is a diagram showing an example of a processing procedure for referring to existing information according to the first embodiment of the present invention.

When requested by the function U to refer to user information to which a new attribute is added, the information processing apparatus 100 receives the request through the view 21 (step S101).

The view 21 requests the information management unit 22 to acquire the user information in accordance with the request (step S102).

The information management unit 22 accesses the persistent data D of the apparatus (step S103), acquires currently-registered user information (step S104), and passes the acquired user information to the view 21 as an acquisition request source (step S105).

The view 21 determines a difference between attribute data constituting the user information received from the information management unit 22 and attribute data constituting the user information for which the reference is requested (step S106). As a result, if there is any difference in an attribute configuration between them (YES in step S106), the view 21 requests the information management unit 22 to generate new user information (step S107). Accordingly, the information management unit 22 assures a storage region capable of storing the attribute data (existing attribute data and the added new attribute data) constituting the latest user information on the memory and passes a pointer to the assured storage region to the view 21.

The view 21 stores the values of the attribute data constituting the existing user information acquired in step S105 based on the pointer to the storage region received from the information management unit 22 (step S108: reflection of existing attribute values). Furthermore, as for the values of the newly-added attribute data (shortfall attribute data), the view 21 stores defaults (step S109: addition of shortfall attribute values).

As a result, the view 21 passes the user information generated in the memory as user information to which the new attributes are added to the function U that has requested the reference to the information (step S110)

As described above, the information processing apparatus 100 according to this embodiment does not reflect the addition of the new attribute data on the persistent data D right after the new attribute data are added to the information handled in the apparatus. Instead, the information processing apparatus 100 matches the data in the memory and passes the matched data to the information request source.

(Updating Existing Information)

FIG. 6 is a diagram showing an example of a processing procedure for updating existing information according to the first embodiment of the present invention.

When user information is provided for the function U and then changed as shown in the processing procedure in FIG. 5 (step S201), the information processing apparatus 100 receives a request for updating the user information from the function U through the view 21 (step S202).

The view 21 requests the information management unit 22 to generate new user information in accordance with the request (step S203).

The information management unit 22 assures the storage region capable of storing attribute data constituting the latest user information in the memory (step S204: construction of user information) and passes the pointer to the assured storage region to the view 21 (step S205).

The view 21 stores the values of the attribute data constituting the changed user information acquired in step S202 based on the pointer to the storage region received from the information management unit 22 (step S206: reflection of changed contents). Furthermore, the view 21 passes the changed user information generated in the memory to the information management unit 22 again to instruct the update of the user information in the persistent region (step S207).

As a result, the information management unit 22 accesses the persistent data D of the apparatus in accordance with the instructions for updating the user information and updates the persistent data D of the currently-registered user information to the data of the received user information (step S208).

As described above, in the information processing apparatus 100 according to this embodiment, the content of the changed information is reflected on actual data in the memory, and then the persistent region of the information corresponding to the changed information is updated.

Accordingly, the information processing apparatus 100 does not unnecessarily waste the hardware resource of the storage device because the attribute data are not added to data unrelated to the data operations (reference and update). In addition, the information processing apparatus 100 does not reduce the performance (processing time for the data operations) for the data operations (high-speed processing is made possible) because the attribute data are not added to all the information.

(Deleting Existing Information)

The deletion of existing information is not described based on a figure unlike the description of the reference and update of the existing information. When receiving a request for deleting prescribed attribute data from the function U, the view 21 does not actually delete attribute data to be deleted. In this case, the view 21 just provides information that does not contain the attribute data to be deleted at the time of referring to user information. In other words, similarly to the cases of the reference and update, the deletion of the attribute data is performed when the data to be deleted are first accessed.

Accordingly, even if the attribute data are not temporarily used such as a case in which the function U is removed or temporarily stopped, the loss of significant data could not be caused because the persistent data D are present in the information processing apparatus 100.

(Mechanism for Operating (Generating/Adding/Deleting) Attribute Data)

Here, a description is made of a mechanism for flexibly dealing with an increase and decrease in attribute data constituting all sorts of information handled in the apparatus caused by the function expansion without changing the software components of the apparatus.

(Information Management Unit)

FIG. 7 is a diagram showing an example of the software components managed by the information management unit 22 according to the first embodiment of the present invention.

In the information processing apparatus 100 according to this embodiment, the information management unit 22 generates the attribute configuration of the latest information in the memory in accordance with generation instructions from the view 21.

The information management unit 22 is configured to manage the software components shown in FIG. 7. An information generation unit 31 adds information handled in the apparatus, and an attribute construction unit 32 adds attribute data constituting the information. The information management unit 22 controls the software components to flexibly generate the information.

The respective function units are the software components and stored in the ROM 105 of the information processing apparatus 100. These units implement the function when they are read in the RAM 106 and then executed by the CPU 108.

The information management unit 22 is a unique software component incorporated in the apparatus, while the information generation unit 31 and the attribute construction unit 32 are one or more software components that can be removed from the apparatus in expandable units.

Accordingly, the information generation unit 31 and the attribute construction unit 32 are included in a plug-in 30 or the like for the function expansion, and they are installed in the apparatus simultaneously with the installation of the plug-in 30. The same applies to the uninstallation of the information generation unit 31 and the attribute construction unit 32.

As described above, the information processing apparatus 100 according to this embodiment does not include the software components (information generation unit 31 and attribute construction unit 32) that generate/add/delete the attribute data of information corresponding to the function expansion. That is, the information processing apparatus 100 is configured not to change the software components so as to deal with an increase and decrease in the attribute data of the information. Moreover, the information processing apparatus 100 collectively manages and controls the information generation unit 31 and the attribute construction unit 32 introduced as required by the installation/uninstallation of the plug-in 30 or the like with the information management unit 22. Therefore, the information processing apparatus 100 flexibly deals with an increase and decrease in attribute data constituting all sorts of information handled in the apparatus caused by the function expansion.

(Data of Function Units)

FIGS. 8A through 8D are diagrams showing an example of the data configurations of the software components according to the first embodiment of the present invention.

As described above, the information generation unit 31 and the attribute construction unit 32 can be removed from the apparatus in expandable units. Therefore, it can be assumed that plural of the information generation units 31 and the attribute construction units 32 operate in the apparatus. Accordingly, the information management unit 22 specifies the information generation unit 31 that generates designated information from among the plural information generation units 31 based on the name of the generated information in accordance with instructions for generating the information from the view 21, and then instructs the specified information generation unit 31 to generate the information. Similarly to the information management unit 22, the information generation unit 31 specifies the attribute construction unit 32 that constructs a designated attribute from among the plural attribute construction units 32, and then instructs the specified attribute construction unit 32 to construct the designated attribute. As a result, the attribute construction unit 32 constructs the attribute data constituting the information.

In accordance with the above operation, the attribute data of the information handled in the apparatus are added/deleted/updated.

In order for the respective function units to operate cooperatively, the software components must have all sorts of control data for controlling their operations. FIGS. 8A through 8D show an example of the control data of the function units.

The characteristics of the control data are briefly described below. FIG. 8A shows an example of the control data of the plug-in 30. The control data of the plug-in 30 contain the data of information added at the time of the function expansion ("user information" in FIG. 8A) and the module of the attribute construction unit 32 that constructs added attribute data ("FAX attribute construction unit" in FIG. 8A).

Furthermore, FIG. 8B shows an example of the control data of the information management unit 22. The control data of the information management unit 22 contain the data of information managed and operated by the apparatus ("user information" and "bibliographic information") and data indicating links to the respective information generation units 31 that generate the user information and the bibliographic information (list of generation units such as a "user information generation unit" and a "bibliographic information generation unit" in FIG. 8B).

FIG. 8C shows an example of the control data of the information generation unit 31. The control data of the information generation unit 31 contain the data of generated information ("user information" in FIG. 8C) and data indicating links to the respective attribute construction units 32 that construct attribute data constituting the information (list of construction units such as a "basic attribute construction unit," an "authentication attribute construction unit," and a "FAX attribute construction unit").

Furthermore, FIG. 8D shows an example of the control data of the attribute construction unit 32. The control data of the attribute construction unit 32 contain the data of constructed attribute ("FAX attribute" in FIG. 8D) and data related to the value of the attribute ("FAX number" in FIG. 8D). In addition, the data related on the value of the attribute also contain the data of a default and a construction rule ("default:-" and "character number limit: 13" in FIG. 8D).

By referring to the control data described above, the operations of the function units can be implemented.

(Updating Control Data)

The control data of the information management unit 22 and the information generation unit 31 must be updated in accordance with a change in software configurations of the apparatus (increase and decrease in the software components caused by the function expansion). Next, taking processing for updating the list of the construction units of the information generation unit 31 as an example, a description is made of the update of the control data of the function units corresponding to the installation/uninstallation of the plug-in 30.

(At Installation of Plug-In: At Addition of Attribute Construction Unit)

FIG. 9 is a diagram showing an example of a processing procedure (installation procedure) for adding the attribute construction unit 32 according to the first embodiment of the present invention.

When the plug-in 30 is installed (step S301), the information processing apparatus 100 calls a function, in which the data of added information (hereinafter referred to as a "dependence information name"), the module of the attribute construction unit 32 (hereinafter referred to as an "attribute construction module"), and the module name of the attribute construction unit 32 (hereinafter referred to as an "attribute construction name") are set as parameters, from the installed plug-in 30 based on the control data of the plug-in 30, and then instructs the information management unit 22 to add an attribute (step S302).

The information management unit 22 refers to the list of the generation units for the control data based on the dependence information name, retrieves the information generation unit 31 that generates designated information (step S303), calls the function in which the attribute construction module and the attribute construction name are set as the parameters, and instructs the specified information generation unit 31 to add the attribute (step S304).

As a result, the information generation unit 31 adds the attribute construction name to the list of the construction units for the control data (step S305), and the attribute construction module is held in the prescribed storage region.

(At Uninstallation of Plug-In: At Deletion of Attribute Construction Unit)

FIG. 10 is a diagram showing an example of a processing procedure (uninstallation procedure) for deleting the attribute construction unit 32 according to the first embodiment of the present invention.

When the uninstallation of the plug-in 30 is instructed (step S401), the information processing apparatus 100 calls the function, in which the dependence information name to be deleted, the attribute construction module, and the attribute construction name are set as the parameters, from the plug-in 30 to be uninstalled based on the control data of the plug-in 30, and then instructs the information management unit 22 to delete an attribute (step S402).

The information management unit 22 refers to the list of the generation units for the control data based on the dependence information name, retrieves the information generation unit 31 that generates designated information (step S403), calls the function in which the attribute construction module and the attribute construction name are set as the parameters, and instructs the specified information generation unit 31 to delete the attribute (step S404).

As a result, the information generation unit 31 deletes the attribute construction name from the list of the construction units for the control data (step S405), and the attribute construction module is deleted from the prescribed storage region.

(Mechanism for Operating Attribute Data of User Information)

Here, taking user information handled in the apparatus as an example, a description is made of the above function configuration for operating attribute data and operations for the attribute data with the function units.

(Function Configuration for Operating Data of User Information)

Figure 11:
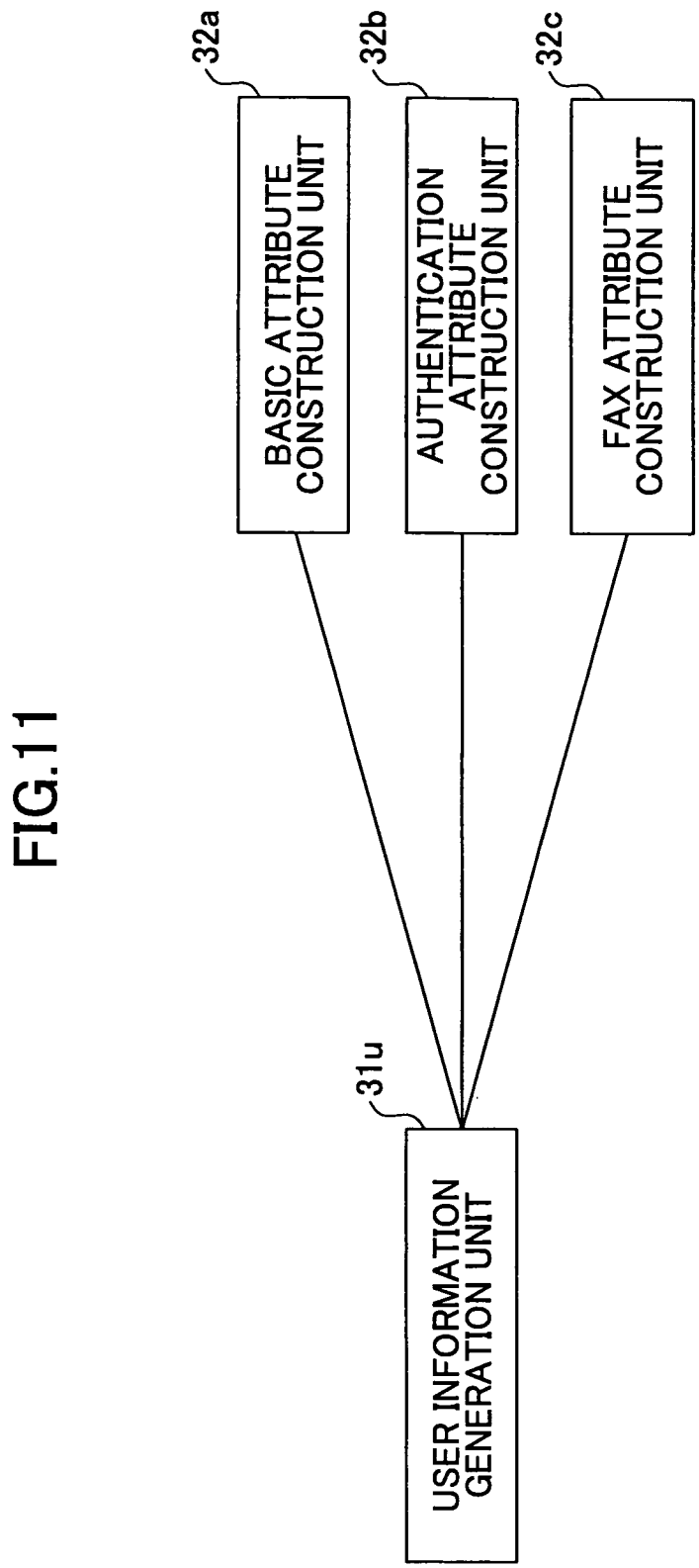
FIG. 11 is a diagram showing an example of a software configuration for generating user information according to the first embodiment of the present invention.

FIG. 11 is a diagram showing an example of a software configuration for generating user information according to the first embodiment of the present invention. As shown in FIG. 11, the user information handled in the apparatus is generated by a user information generation unit 31*u*. In the list of the construction units for the control data of the user information generation unit 31*u*, a basic attribute construction unit 32*a*, an authentication attribute construction unit 32*b*, and a FAX attribute construction unit 32*c* are registered. The basic attribute construction unit 32*a* that constructs attribute data as the basis of user information, the authentication attribute construction unit 32*b* that constructs attribute data added with the expansion of an authentication function, and the FAX attribute construction unit 32*c* that constructs attribute data added with the expansion of a FAX function are registered. As described above, the information processing apparatus 100 has the software configuration in which the information management unit 22 controls the function units related to user information based on the control data.

(Operating Data of User information)

FIG. 12 is a diagram showing an example of a processing procedure for adding attribute data to user information according to the first embodiment of the present invention. The processing procedure shown in FIG. 12 is a specific description of the processing procedure performed by the information management unit 22 shown in FIG. 5.

When requested to construct the latest user information (step S501), the information management unit 22 specifies the user information generation unit 31*u* from among the respective information generation units 31 that operate in the apparatus based on the control data and then instructs the user information generation unit 31*u* to generate the user information (step S502).

The user information generation unit 31*u* assures the prescribed storage region capable of storing the latest user information on the memory and generates user information having no attribute (step S503).

The user information generation unit 31*u* calls a function in which the generated user information having no attribute is set as a parameter and instructs the basic attribute construction unit. 32*a* to add an attribute in accordance with the order registered in the list of the construction units for the control data (step S504).

The basic attribute construction unit 32*a* stores the data of a basic attribute in the user information having no attribute and passes the user information to which the basic attribute is added to the user information generation unit 31*u* (step S505).

Then, the user information generation unit calls a function in which the user information to which the basic attribute is added is set as a parameter and instructs the authentication attribute construction unit 32*b* to add the attribute in accordance with the order registered in the list of the construction units for the control data (step S506).

The authentication attribute construction unit 32*b* stores the data of an authentication attribute in the user information to which the basic attribute is added and passes the user information to which the authentication attribute is added to the user information generation unit 31*u* (step S507).

Finally, the user information generation unit 31*u* calls a function in which the user information to which the authentication attribute is added is set as a parameter and instructs the FAX attribute construction unit 32*c* to add the attribute in accordance with the order registered in the list of the construction units for the control data (step S508).

The FAX attribute construction unit 32*c* stores the data of the authentication attribute in the user information to which the authentication attribute is added and passes the user information to which the FAX authentication attribute is added to the user information generation unit 31*u* (step S509).

As a result, the user information generation unit 31*u* passes the latest user information completed in the memory to the information management unit 22, which has instructed the user information generation unit 31*u* to generate the user information (step S510). The completed latest user information is provided from the information management unit 22 to the function U (step S511).

(State Transition of Attribute Configuration in Processing Step at Data Operations)

FIG. 13 is a diagram showing an example of operations when attribute data 42 are added to user information 41*u* according to the first embodiment of the present invention. Here, based on a corresponding processing procedure, a description is made of the transition of an attribute configuration when the new attribute data 42 are added to the user information 41*u* in accordance with the processing procedure shown in FIG. 12.

As shown in FIG. 13, when step S503 is performed, the prescribed storage region is assured on the memory and the user information 41*u* having no attribute is generated in the memory. Then, when step S505 is performed, attribute data 42*a* such as an ID, a user name, and a gender are added to the user information 41*u* generated on the memory. At a time when the attribute data 42*a* are added to the user information 41*u*, the attribute data 42 constituting the user information 41*u* are added. Furthermore, when step S507 is performed, the attribute data 42*b* of a password are added to the user information 41*u* to which the basic attribute is added. Furthermore, when step S509 is performed, the attribute data 42*c* of a FAX number are added to the user information 41*u* to which the authentication attribute is added.

As described above, in the information processing apparatus 100 according to this embodiment, the information generation unit 31 generates an empty case in which the respective attribute data 42 constituting information are stored in the memory, and the respective attribute construction units 32 are instructed to store data in the empty case. In this manner, the new attribute data 42 are added in a relay system. Furthermore, the respective attribute data 42 are deleted in the relay system as in the case of the addition of the attribute data 42. Accordingly, the information processing apparatus 100 can manage and operate a theoretically infinite number of the attribute data 42. Furthermore, the attribute construction units 32 constituting the respective attribute data 42 do not depend on each other and are independent software components. Therefore, the attribute construction units 32 do not influence other attribute data 42.

(User Operations and State Transition of Persistent Region)

Next, a description is made of an example of operations in which the user views the user information 41*u* through a UI (User Interface) provided for users, adds the FAX attribute data 42*c*, and updates the user information 41*u*, and the state transition of the persistent region corresponding to the operations in the information processing apparatus 100.

Figure 14B:
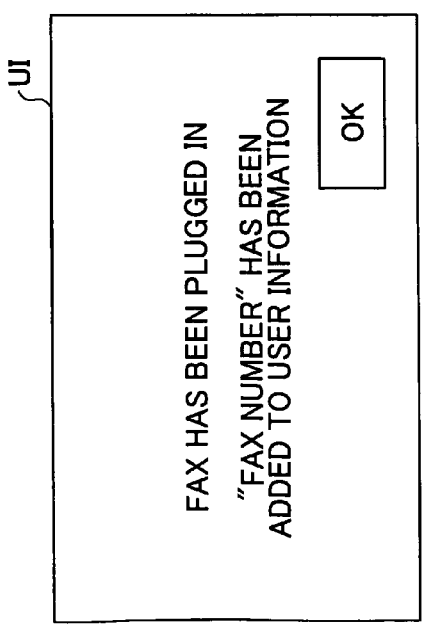

FIGS. 14A and 14B are diagrams showing an example (part 1) of the user operations when the FAX attribute data 42*c* are added to the user information 41*u* according to the first embodiment of the present invention. FIG. 14A shows an example of a UI display before the addition of the plug-in 30 of a FAX function and the data state of the persistent region. As shown in FIG. 14A, a FAX attribute is not added to the persistent region (persistent data D) at this stage, and the user information 41u is constituted of only the basic attribute. FIG. 14B shows an example of the UI display after the addition of the plug-in 30 of the FAX function and the data state of the persistent region (persistent region D). As shown in FIG. 14B, the FAX attribute is added to the persistent region (persistent data D) at this stage. However, the values of the attribute data 42c are not stored.

Figure 15A:
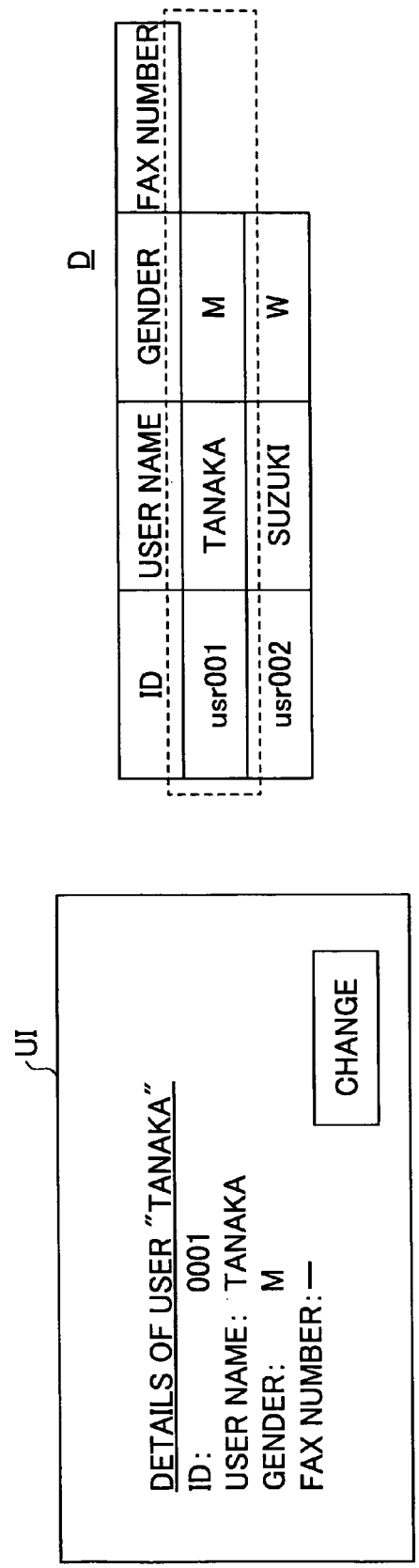

FIGS. 15A and 15B are diagrams showing an example (part 2) of the user operations when the FAX attribute data 42c are added to the user information 41u according to the first embodiment of the present invention. FIG. 15A shows an example of the UI display when the user information 41u is referred to after the installation of the FAX function and the data state of the persistent region. As shown in FIG. 15A, the value of a FAX number "-" is shown on the UI display. The information displayed at this stage shows the data of the region encircled by dotted lines in FIG. 15A, and the added value of the FAX number is only the default provided in the view 21. Therefore, as shown in FIG. 15A, there is no change in the region of the FAX attribute in the persistent region (persistent data D). FIG. 15B shows an example of the UI display in which the value of the FAX attribute is changed after a "change" button is pressed and the data state of the persistent region. As shown in FIG. 15B, the value of the FAX number is changed from the default "-" to "06-XXXX-0123." However, at this stage, an input value (changed value) is not reflected on the FAX attribute in the persistent region (persistent data D) because an "OK" button is not pressed.

FIGS. 16A and 16B are diagrams showing an example (part 3) of the user operations when the FAX attribute data 42c are added to the user information 41u according to the first embodiment of the present invention. FIG. 16A shows an example of the UI display after the "OK" button is pressed and the data state of the persistent region. As shown in FIG. 16A, the input value is displayed on the UI display. At this stage, the changed value is reflected on the FAX attribute in the persistent region (persistent data D). As a result, when the user information 41u is referred to and viewed again, the UI display as shown in FIG. 16B is displayed. The information displayed at this stage shows the data of the region encircled by the dotted lines in FIG. 16B, and the changed value of the FAX number is provided.

(Summary)

As described above, the information processing apparatus 100 according to the first embodiment of the present invention has the configuration in which the attribute construction unit 32 (attribute construction module) 32, which performs the data operations such as addition/deletion/change of the attribute data 42, is added in and deleted from the apparatus in accordance with the installation/uninstallation of the plug-in 30 that performs the function expansion. Specifically, the information generation unit 31 specifies the attribute construction unit 32 that performs the data operations of the designated attribute data 42 from among the installed attribute construction units 32 based on the list of the construction units as the control data, which is registered at the time of installation. As a result, the data operations of the attribute data 42 are performed by the specified attribute construction unit 32. Moreover, in the data operations, instead of accessing the persistent region such as the HDD 110 and directly operating data, information to be operated is first generated on the memory and the data of the generated information are operated, thereby adding/deleting/changing the attribute data 42 in a pseudo manner.

Accordingly, the information processing apparatus 100 can flexibly deal with an increase and decrease in the attribute data 42 constituting all sorts of information handled in the apparatus caused by the function expansion without changing the software components of the apparatus.

Second Embodiment

Figure 17:
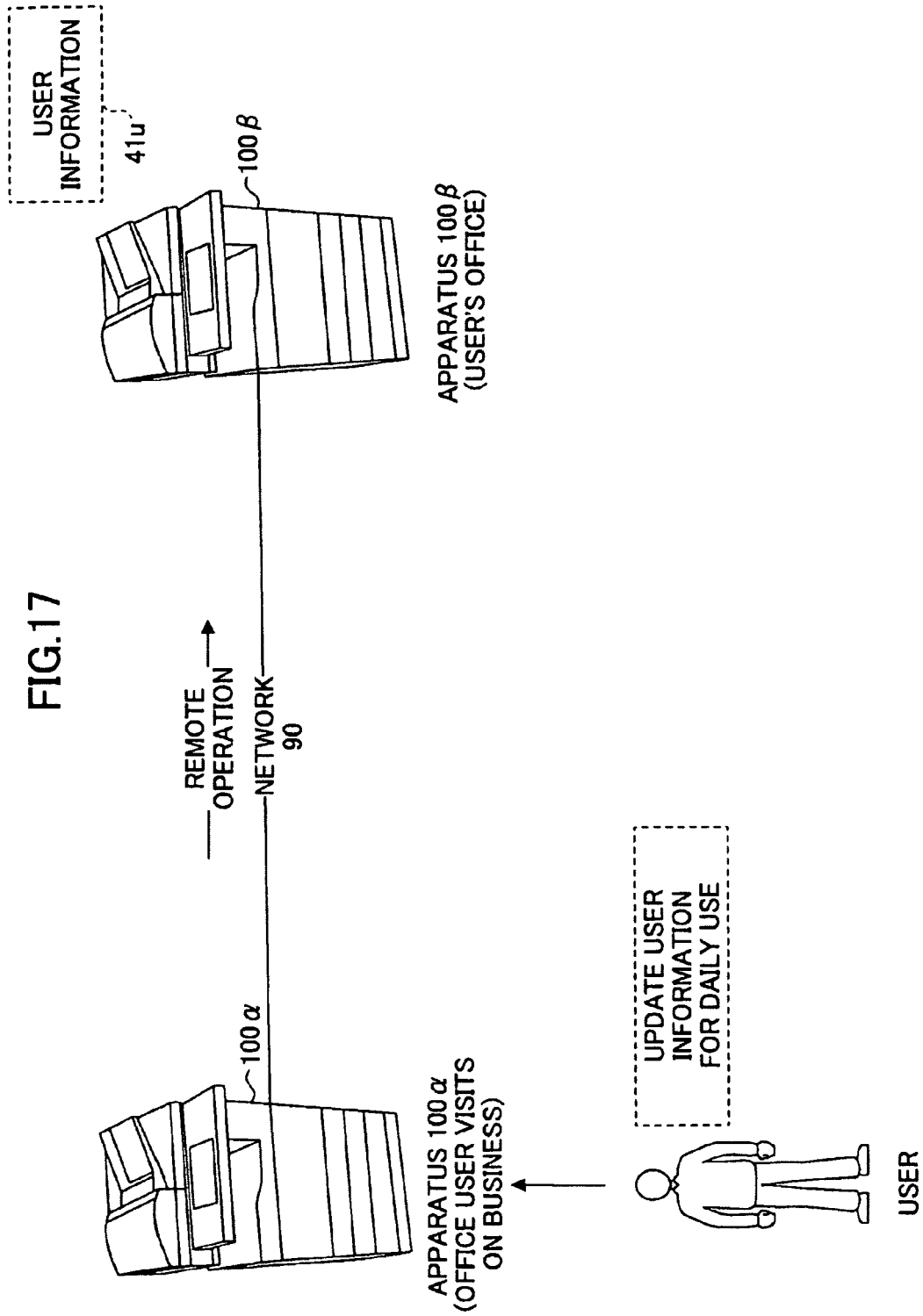
FIG. 17 is a diagram showing an example of operations of cooperation between apparatuses.

FIG. 17 is a diagram showing an example of operations of cooperation between apparatuses. As shown in FIG. 17, an apparatus α (hereinafter referred to as an "apparatus 100α") and an apparatus β (hereinafter referred to as an "apparatus 100β") are connected to each other through an electrical communications line such as a network 90, and they are capable of remotely operating all sorts of their information with each other. For example, FIG. 17 shows an example of a case in which the user updates the user information 41u of the apparatus 100β provided at an office to which the user belongs through the apparatus 100α provided at an office the user visits on business. With current communications technologies, and the development of information processing technologies, it is common to provide a system capable of operating as a client server with the plural apparatus 100α and apparatus 100β cooperating each other.

Figures 18A, 18B:
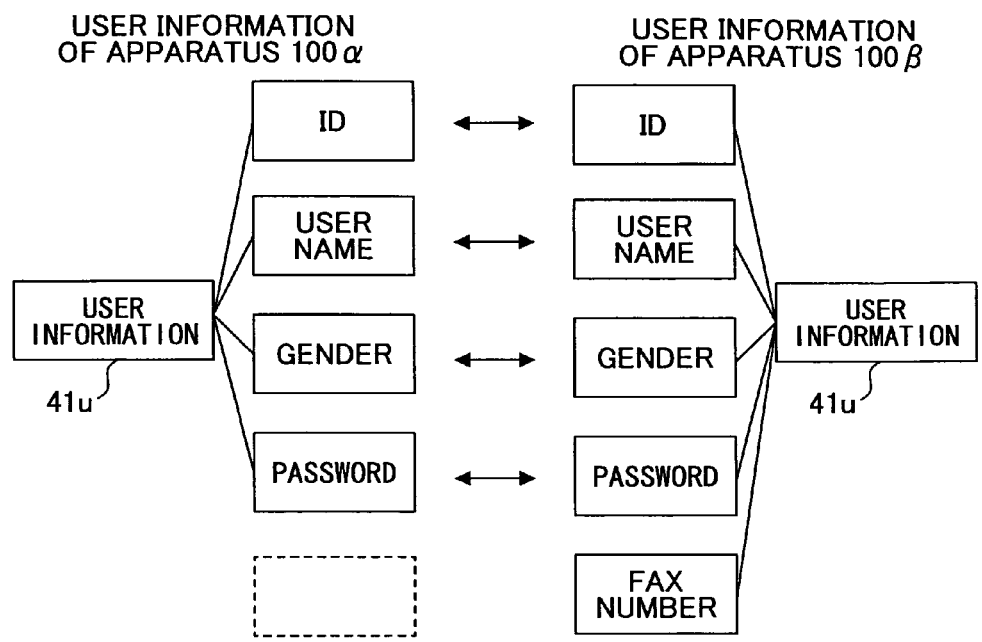
FIGS. 18A through 18C are diagrams showing problems assumed in the cooperation between the apparatuses.
Figure 18C:
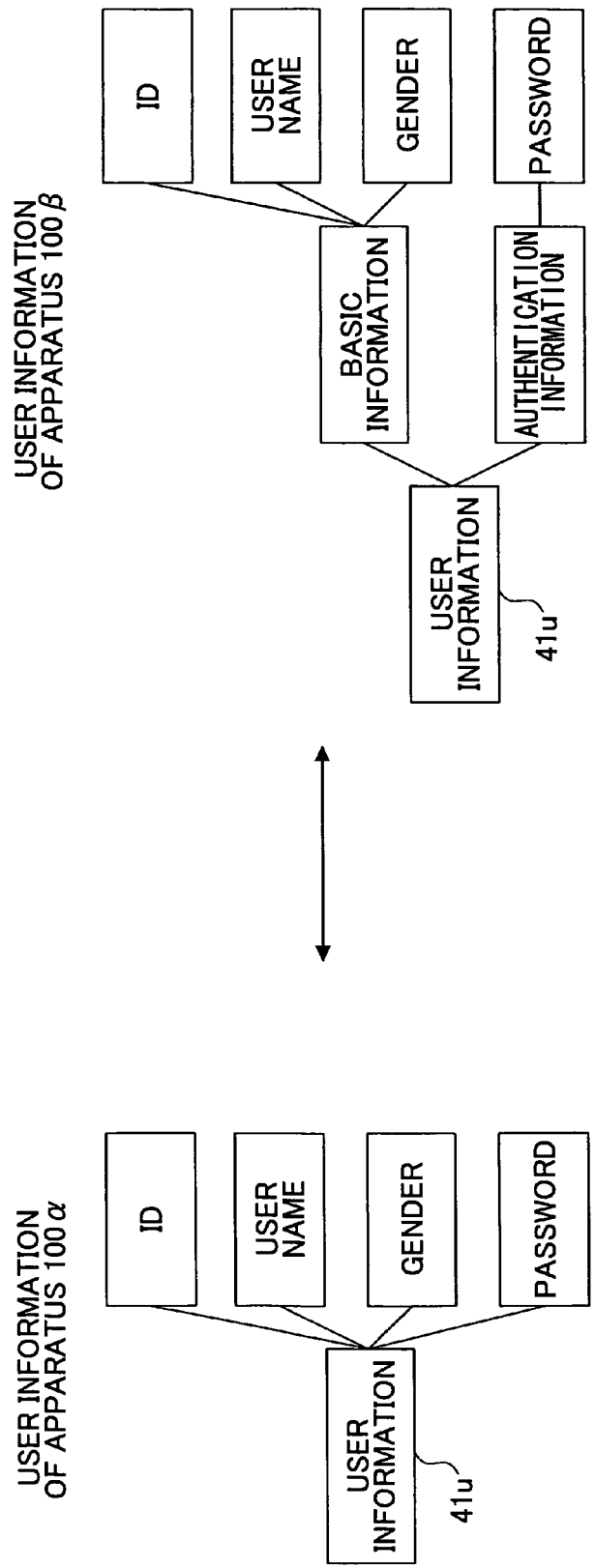

However, in the cooperation between the apparatuses, there are some problems due to the function expansion as in the case of the first embodiment. The problems are shown in FIGS. 18A through 18C. FIGS. 18A through 18C are diagrams showing the problems assumed in the cooperation between the apparatuses.

The first problem lies in a case in which the apparatus 100α and the apparatus 100β have different functions. As shown in FIG. 18A, if the functions to be operated are different, the attribute data 42 constituting the information of the apparatus 100α and the apparatus 100β may be different. For example, if the apparatus 100β has an attribute ("FAX attribute" in FIG. 18A) that is not provided in the apparatus 100α, the user cannot obtain the attribute that is provided in only the apparatus 100β through the apparatus 100α and vice versa.

The second problem lies in a case in which the apparatus 100α and the apparatus 100β have information that refers to the same type of data but has different data specifications. As shown in FIGS. 18B and 18C, even if the apparatus 100α and the apparatus 100β have the same type of data ("user information" in FIG. 18C), the data specifications may be different in matters of detail between the apparatus 100α and the apparatus 100β. For example, as for the maximum character length of the data, "63 characters" are allowed in the apparatus 100α, while "255 characters" are allowed in the apparatus 100β. In addition, as for an attribute configuration, the apparatus 100α has a single layer, while the apparatus 100β has multiple layers. In these cases, when the user attempts to use the data of the apparatus 100β through the apparatus 100α, the functions may act in an unexpected manner because the data specifications (maximum character length and attribute configuration) capable of being handled are different.

Therefore, in order to perform the cooperation between the apparatuses 100α and 100β capable of performing the function expansion shown in FIG. 17, the above problems must be solved.

Accordingly, this embodiment provides an information processing apparatus that can solve the above problems and deal with an increase and decrease in the attribute data 42 constituting all sorts of information handled in the apparatus caused by the function expansion without changing the software components of the apparatus.

Specifically, for example, when the user remotely operates the apparatus 100β through the apparatus 100α, the apparatus 100α is caused to temporarily operate a mechanism (information generation logic of the apparatus 100β) for generating information to be operated only during a login (remote operation). If the apparatus 100α is unable to operate the mechanism (information generation logic of the apparatus 100β) for generating the information to be operated (i.e., if there are prescribed conditions for security) in the data operations, a mechanism for generating the information of the apparatus 100α (information generation logic of the apparatus 100α) is used. Furthermore, the data specifications of information to be used are confirmed before the information is provided by the apparatus 100α and the apparatus 100β. Accordingly, the unexpected action of the functions due to a difference in the data specifications can be prevented. That is, the functions of the apparatus 100α and the apparatus 100β are limited in advance.

In this manner, this embodiment solves the above problems in the cooperation between the apparatuses in the system in which the plural apparatuses 100α and 100β are capable of being remotely operated through the electrical communications line such as the network 90.

Next, the information processing apparatus according to this embodiment is described in detail. Similarly to the first embodiment in which the multifunction peripheral 100 is described as the information processing apparatus 100, the apparatus 100α or the apparatus 100β is described as the information processing apparatus 100 in the information processing apparatus of this embodiment.

(Information Processing Function in Cooperation Between Apparatuses)

First, a description is made of a basic processing procedure for causing the apparatus 100α to temporarily operate the mechanism (information generation logic of the apparatus 100β) for generating information to be operated only during a login (remote operation). Note that the configuration of the information processing apparatus according to this embodiment is the same as that of the information processing apparatus according to the first embodiment, and the descriptions thereof are thus omitted here.

Figure 19:
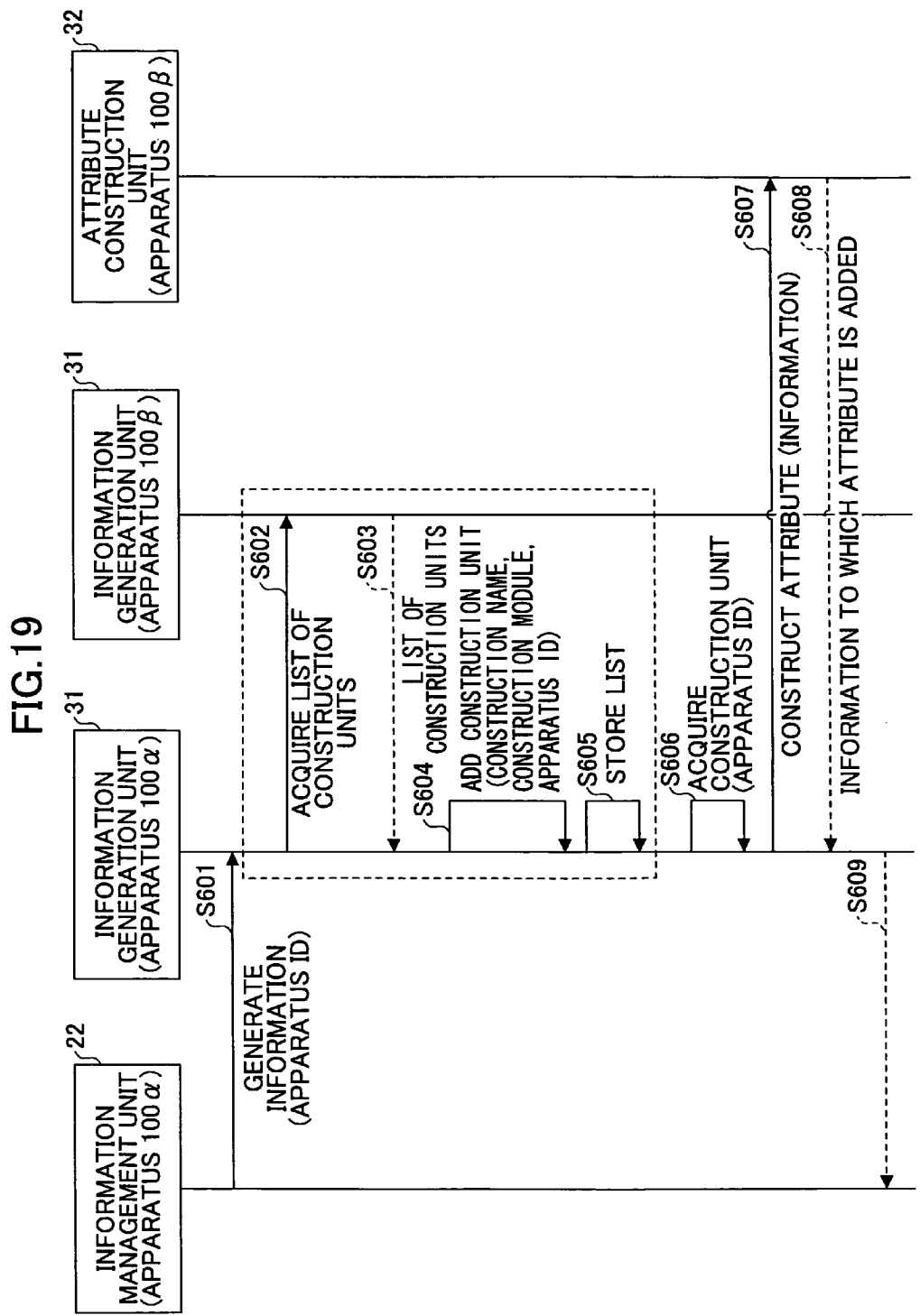
FIG. 19 is a diagram showing an example of a basic processing procedure in the cooperation between the apparatuses according to a second embodiment of the present invention.

FIG. 19 is a diagram showing an example of the basic processing procedure in the cooperation between the apparatuses according to the second embodiment of the present invention.

When the apparatus 100α receives a request for referring to information from the user through the view 21 (when the user logs in through prescribed authentication), the view 21 passes to the information management unit 22 an apparatus ID for discriminating an apparatus having information for which reference is requested.

The information management unit 22 of the apparatus 100α calls a function in which the apparatus ID is set as a parameter and instructs the information generation unit 31 to generate information (step S601).

The information generation unit 31 of the apparatus 100α accesses the apparatus 100β specified based on the apparatus ID (step S602) and acquires the list of the construction units for the control data from the information generation unit 31 of the apparatus 100β (step S603). At this time, the module of the attribute construction unit (attribute construction unit 32) of the apparatus 100β, which is registered in the list of the construction units, is uploaded to the apparatus 100α.

The information generation unit 31 of the apparatus 100α calls a function in which the attribute construction name of the apparatus 100β, the downloaded module of the attribute construction unit, and the apparatus ID are set as parameters, adds and registers the attribute construction unit 32 acquired from the apparatus 100β to and in the list of the construction units of its own (step S604), and stores the list of the construction units in the apparatus 100α (step S605). The processing procedure (the part encircled by dotted lines in FIG. 19) from steps S602 through S605 is performed when the apparatus 100α as a client once accesses the apparatus 100β as a server, and may be performed once at this timing during the login (and may be performed once until a logout).

The information generation unit 31 of the apparatus 100α calls the function in which the apparatus ID is set as the parameter, refers to the list of the construction units in which the attribute construction unit 32 of the apparatus 100β is added and registered in step S605, and specifies the attribute construction unit 32 downloaded to the apparatus 100α (step S606).

The information generation unit 31 of the apparatus 100α calls the function in which the information requested to be referred to is set as the parameter and instructs the specified attribute construction unit 32 to construct an attribute (step S607).

Upon receipt of the instructions for constructing the attribute, the attribute construction unit 32 adds the attribute data 42 constituting information to the information and passes the information to the information generation unit 31 (step S608).

As a result, the information generation unit 31 of the apparatus 100α passes the generated information to which the attribute data 42 are added to the information management unit 22 (step S609). Then, the information is passed from the information management unit 22 to the view 22. In this manner, the information is provided for the user through the view 21.

As described above, in the information processing apparatus 100 according to this embodiment, (1) designation is made as to which apparatus and which attribute construction unit 32 are to be used at the request for generating information, (2) the attribute construction unit 32 after designated and downloaded is registered in the list of the construction units of the information generation unit 31 of the apparatus 100α as the client when the apparatus 100β as the server is first designated at the first time, and (3) the attribute construction unit 32 downloaded from the apparatus 100β as the server is once held.

Accordingly, the apparatus 100α acquires from the apparatus 100β holding the information the information (list of the construction units) related to the attribute construction unit 32 that constructs the attribute data 42 only once. Therefore, the information processing apparatus 100 is not required to acquire another information related to the attribute construction unit 32 when the cooperation between the apparatuses is performed again. As a result, processing performance in the cooperation between the apparatuses is not reduced.

(Mechanism for Operating (Generating/Adding/Deleting) Attribute Data)

Figure 20A:
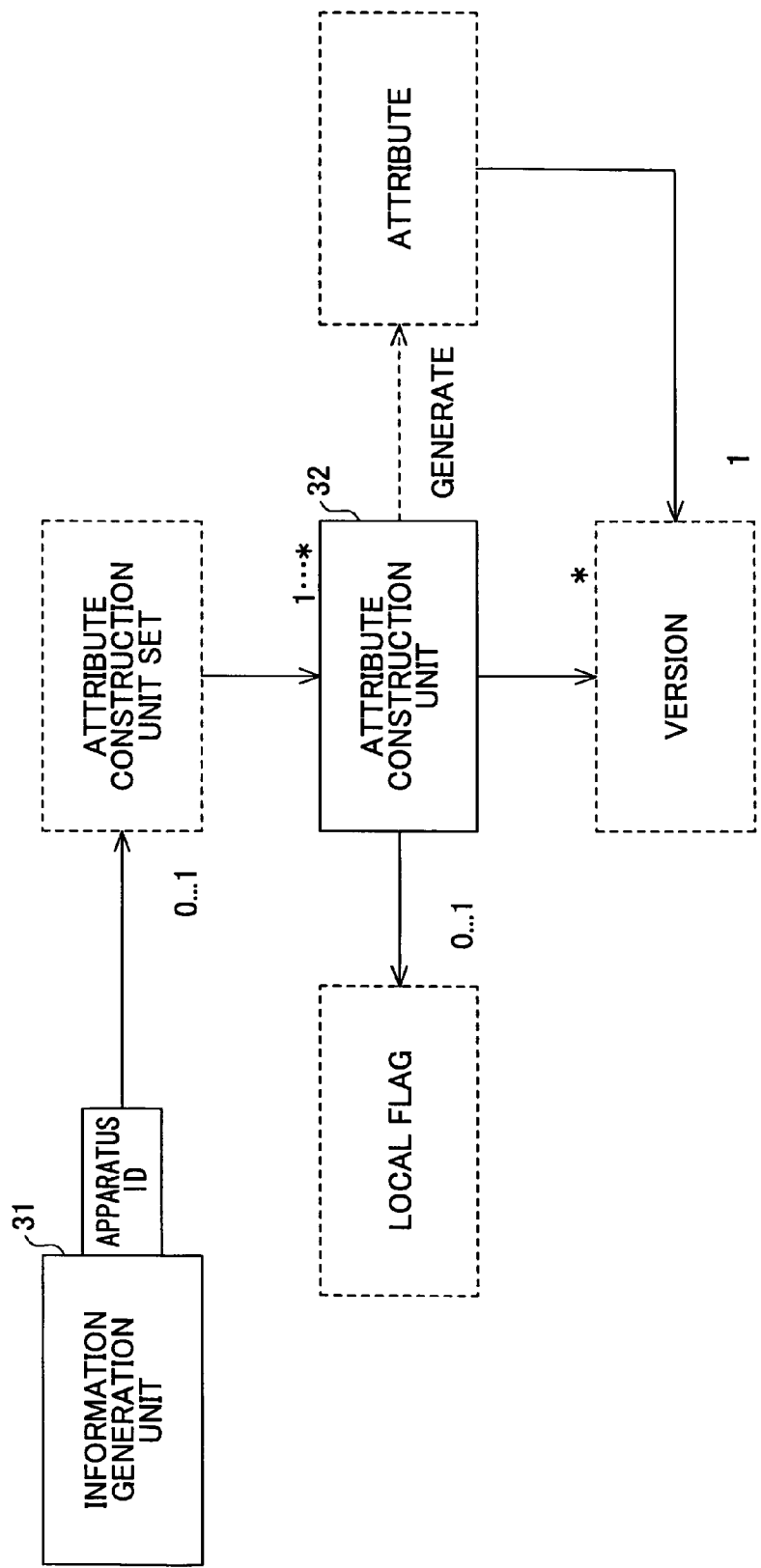

FIGS. 20A and 20B are diagrams showing an example of the software components managed by the information management unit 22 according to the second embodiment of the present invention.

In the information processing apparatus 100 according to this embodiment as well, the information management unit 22 generates the attribute configuration of the latest information in the memory in accordance with instructions through the view 21. Therefore, as the software components managed by the information management unit 22, the information generation unit 31 adds information handled in the apparatus, and the attribute construction unit 32 adds the attribute data 42 constituting the information. The information management unit 22 controls these software components, thereby flexibly generating the information.

The respective function units described above are software components and stored in the ROM 105 of the information processing apparatus 100. The function units are read in the RAM 106 and executed by the CPU 108. In this manner, the functions of the function units are implemented.

This embodiment is different from the first embodiment in the following point.

(Attribute Construction Unit for Apparatus of Information Generation Unit)

The information generation unit 31 according to this embodiment has one or more attribute construction units 32 for every apparatus ID as a group of the attribute construction units (attribute construction unit set).

As described in the processing procedure (the part encircled by the dotted lines in FIG. 19) from steps S602 through S605, the information generation unit 31 stores in the memory the apparatus ID of the apparatus 100α or the apparatus 100β functioning as the server when the user logs in, so as to be associated with data for discriminating the acquired attribute construction units 32. As described above, the information generation unit 31 stores the acquired attribute construction units 32 in the memory so as to be classified for every acquired apparatus 100.

Accordingly, it is possible to determine which apparatus (the apparatus 100α or the apparatus 100β) the attribute construction unit 32 is acquired from among those held in the information processing apparatus 100.

(Local Flags and Versions of Attribute Construction Unit)

The attribute construction unit 32 according to this embodiment has local flags and versions. The local flags are flags showing that the attribute construction unit 32 cannot be operated by another apparatus 100α or apparatus 100β. The flags are set when the plug-in 30 is installed, and the setting values of the flags are treated as those that cannot be varied. Furthermore, the versions are values that indicate the versions of the attribute data 42 constructed by the attribute construction unit 32. The values are values that respond to a case when an inquiry is made from the function U. In accordance with a responded value, the availability of the attribute data 42 is determined on the side where the information is handled. Accordingly, the unexpected action of the functions due to a difference in the data specifications can be prevented in advance.

FIG. 20B shows an example of the control data of the attribute construction unit 32. The attribute construction unit 32 according to this embodiment has the data shown in FIG. 20B in addition to the control data described in the first embodiment. These data are mainly divided into a fixation field and a variable field. In the fixation field, attribute names, local flags, and data types can be set. In the variable field, versions and specifications limitation values (for example, "maximum character string lengths") can be set. Accordingly, the setting values in the fixation field cannot be varied once they are set, while the setting values in the variable field can be varied even after they are set. With this configuration, it is possible to set the control data for preventing mismatch between the apparatuses in the fixation field and set the control data capable of being separately customized between the apparatuses in the variable field, thereby flexibly dealing with the addition/deletion/update of the attribute data 42 due to the function expansion of the apparatus 100α or the apparatus 100β.

For example, FIG. 20B shows an example of the data held in the attribute construction unit 32 that constructs the attribute of an electronic mail not capable of being operated by another apparatus 100α or apparatus 100β due to the data specifications of version 2.0.

(Control for Adding and Registering Attribute Construction Unit with Local Flags)

Figure 21:
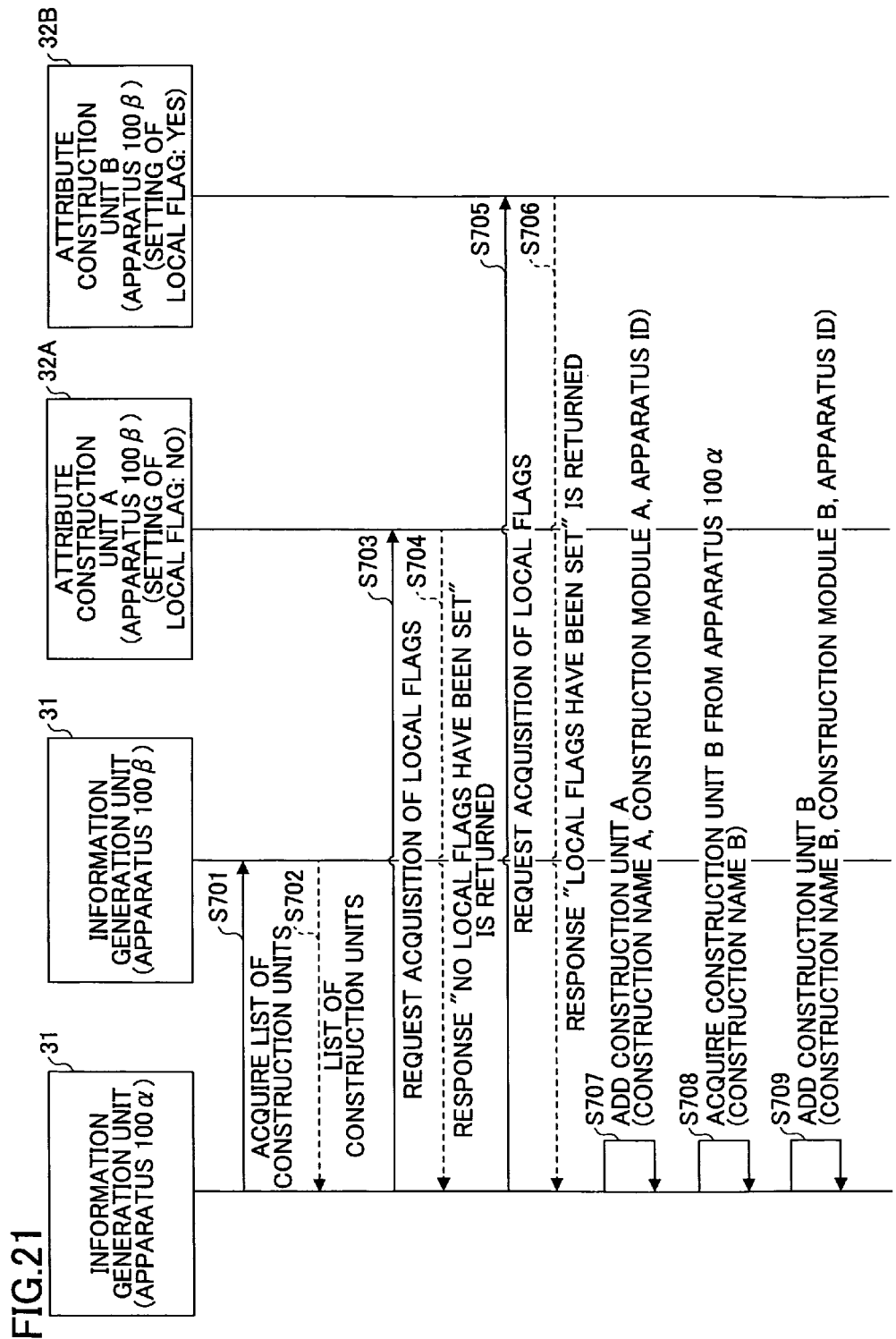
FIG. 21 is a diagram showing an example of a processing procedure for controlling of adding and registering the attribute construction unit in the cooperation between the apparatuses according to the second embodiment of the present invention.

FIG. 21 is a diagram showing an example of the processing procedure for controlling of adding and registering the attribute construction unit in the cooperation between the apparatuses according to the second embodiment of the present invention. The processing procedure shown in FIG. 21 is the one that the information generation unit 31 performs based on the local flags in the processing procedure (the part encircled by the dotted lines in FIG. 19) from steps S602 through S605.

The information generation unit 31 of the apparatus 100α acquires the list of the construction units from the information generation unit 31 of the apparatus 100β (steps S701 and S702).

The information generation unit 31 accesses the attribute construction unit A32A of the apparatus 100β based on the acquired list of the construction units and requests the acquisition of the held local flags from the attribute construction unit A32A (step S703). As a result, the attribute construction unit A32A of the apparatus 100β returns a response "no local flags have been set" to the information generation unit 31 because an invalid value (OFF: 0) has been set to the held local flags (step S704).

The information generation unit 31 accesses the attribute construction unit B32B of the apparatus 100β based on the acquired list of the construction units and requests the acquisition of the held local flags from the attribute construction unit B32B (step S705). As a result, the attribute construction unit B32B of the apparatus 100β returns a response "local flags have been set" to the information generation unit 31 because a valid value (OFF: 1) has been set to the held local flags (step S706).

In this manner, the information generation unit 31 determines whether the attribute construction unit 32 is capable of being operated by the apparatus 100α based on the values of the local flags responded from the respective attribute construction units 32. Then, the information generation unit 31 calls the function in which a construction name A, a construction module A, and an apparatus ID are set as parameters in accordance with the determination result and adds the attribute construction unit A32A capable of being operated by the apparatus 100α from the apparatus 100β to the apparatus 100α (step S707).

Next, the information generation unit 31 calls the function in which a construction name B is set as a parameter because the attribute construction unit B32B is not capable of being operated by the apparatus 100α, acquires the attribute construction unit 32 of the apparatus 100α corresponding to the attribute construction unit B32B (step S708), and calls the function in which the construction name B, a construction module B, and an apparatus ID are set as parameters so as to add the attribute construction unit 32 (step S709).

After that, the information generation unit 31 holds the list of the construction units in which the attribute construction unit 32 is added and registered in accordance with the above processing procedure.

As described above, in the information processing apparatus 100 according to this embodiment, when the information generation unit 31 acquires the list of the construction units, an inquiry is made to the respective attribute construction units 32 registered in the list as to whether valid local flags have been set. If the valid local flags have been set, the information processing apparatus 100 does not register the attribute construction unit 32. Instead, the information processing apparatus 100 adds the same name of itself to the attribute construction unit 32. Accordingly, the information processing apparatus 100 can flexibly deal with requirements such as function specifications and security.

(Use Limitation Function in Cooperation Between Apparatuses)

Next, based on the versions of the attribute data 42 that the attribute construction unit 32 constructs as shown in FIG. 20B, a description is made of processing for performing use limitations with the apparatus 100. As exemplified in the second problem described above, there is information that cannot be used due to a difference in the detailed data specifications.

In this case, if the cooperation between the apparatuses is performed without any countermeasures, the unexpected action of the functions may be caused.

Therefore, the attribute construction unit 32 of the information processing apparatus 100 according to this embodiment has the versions of the attribute data 42.

In other words, when the function of the apparatus 100α uses prescribed information, it confirms the version of the information to determine whether the function can comply with the data specifications of the information before using the information. If the function complies with the version, it can perform desired operations by using the attribute data 42 of the version. However, if the function does not comply with the version, it cannot recognize the meaning of the attribute and the data specifications.

Figure 22:
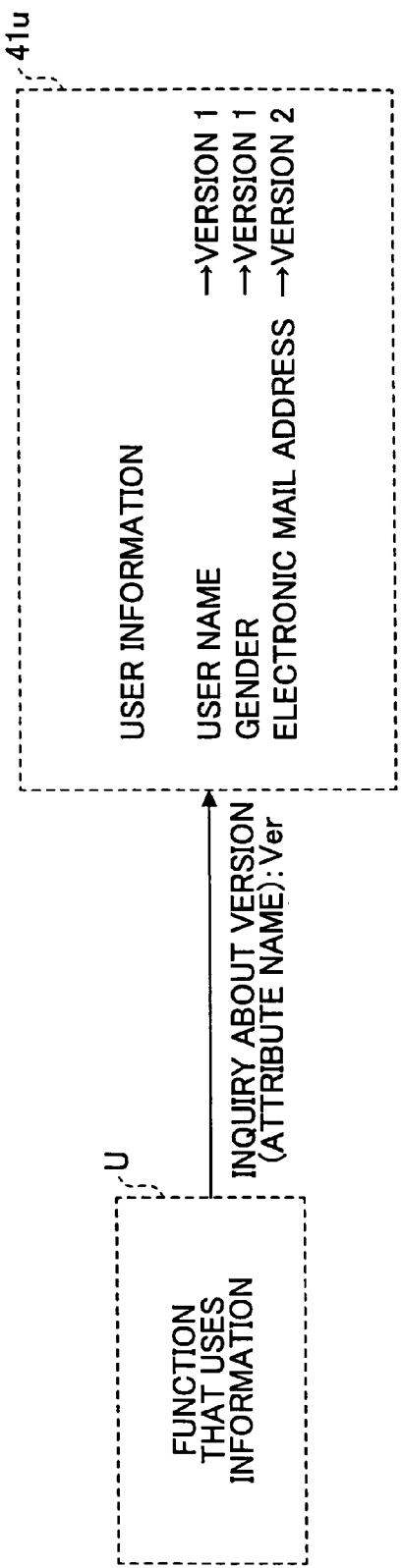
FIG. 22 is a diagram showing a relationship between the use of information and versions according to the second embodiment of the present invention.

FIG. 22 is a diagram showing a relationship between the use of information and the versions according to the second embodiment of the present invention. For example, as shown in FIG. 22, the function U that uses user information 41u inquires about the version with respect to the attribute of an electronic mail address of the user information 41u.

At this time, let it be assumed that the maximum character length of the address is changed from "64 characters" to "128 characters" (change in the data specifications) after the version of the attribute of the electronic mail address of the user information 41u that has made the inquiry is upgraded from "1.0" to "2.0."

In a case in which the function U that uses the user information 41u corresponds to only the version 1.0 and recognizes only the data specifications of up to "64 characters" for the maximum character length of the electronic mail address, the 65th or subsequent characters of the electronic mail address corresponding to the version 2.0 may be truncated. Therefore, the function U that uses the user information 41u cannot properly use and operate the data of the electronic mail address.

Accordingly, in order to deal with the problem, it is necessary to provide a function that prohibits the use of data having different specifications before the function U that uses the user information 41u is provided with information.

(Use Limitation Processing: Part 1)

Figure 23:
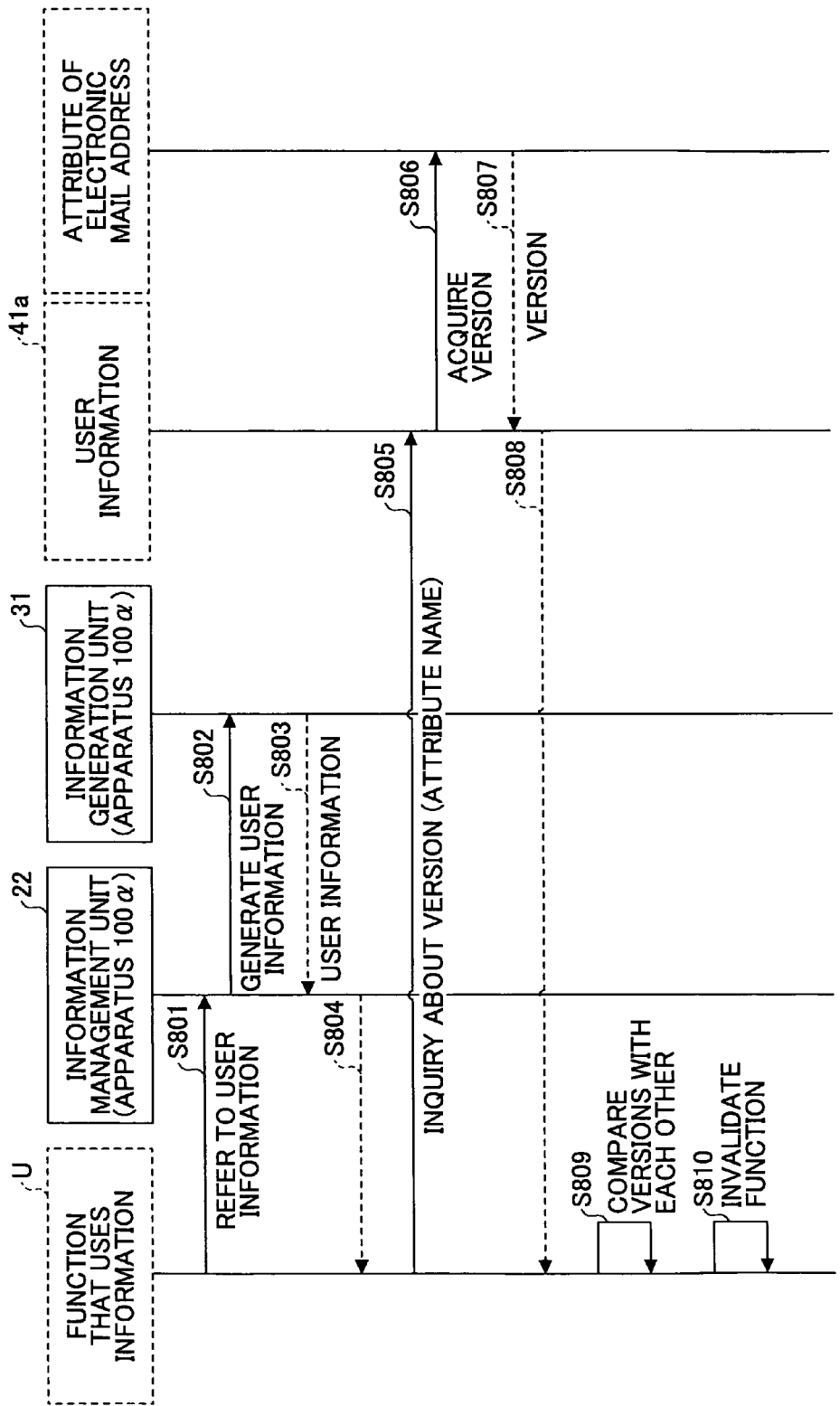
FIG. 23 is a diagram showing an example of a processing procedure (part 1) for use limitations in the cooperation between the apparatuses according to the second embodiment of the present invention.

FIG. 23 is a diagram showing an example of a processing procedure (part 1) for use limitations in the cooperation between the apparatuses according to the second embodiment of the present invention. FIG. 23 shows the processing procedure that the information management unit 22 and the information generation unit 31 perform based on the versions. If the versions of the attribute data 42 to be used as information are different, the function that uses the information can be made invalid in accordance with the processing procedure (unavailability of the information can be informed to the user).

When the apparatus 100α receives through the view 21 a request for referring to the user information 41u from the function U, it instructs the information management unit 22 to refer to the user information 41u (step S801), and the information management unit 22 instructs the information generation unit 31 to generate the user information 41u (step S802).

The information generation unit 31 passes the generated user information 41u to the information management unit 22 (step S803), and the information management unit 22 passes the user information 41u to the view 21 (step S804). In this manner, the apparatus 100α provides the function U with the user information 41u.

Then, the function U calls a function in which an attribute name is set as a parameter and makes an inquiry to the user information 41u about the version (step S805).

The user information 41u requests the acquisition of the version from the attribute data 42 ("attribute of electronic mail address" in FIG. 23) designated based on the attribute name (step S806) and then acquires the value of the version (step S807). The user information 41u returns the value of the acquired version to the function U (step S808).

The function U compares the versions of the attribute data 42 that the function U can use with the acquired version (step S809). If it is found from the result that the versions are different, the function U disables the function (step S810).

As described above, the information processing apparatus 100 according to this embodiment confirms the version of the information to be used before the function U is provided with the information. Accordingly, the use limitations of the functions are performed in advance to prevent the unexpected action of the functions due to a difference in the version.

(Example of Operations at Use Limitations)

Next, a description is made of an example of operations in which the user views the user information 41u through the UI (User Interface) and edits information in the information processing apparatus 100.

FIGS. 24A through 24C are diagrams showing an example (part 1) of the operations when the use limitations in the cooperation between the apparatuses according to the second embodiment of the present invention occur.

In order to remotely operate the apparatus 100β through the apparatus 100α, the user first inputs necessary authentication information and presses a "login" button on an UI screen shown in FIG. 24A so as to perform the login. After the completion of the login, the user selects the user information 41u to be edited through the UI screen on which a list of the information of the apparatus 100β is displayed as shown in FIG. 24B. As a result, as shown in FIG. 24C, the user information 41u of the apparatus 100β is displayed on the UI display of the apparatus 100α.

For example, let it be assumed that the version of the attribute of the "electronic mail address" of the user information 41u of the apparatus 100β is upgraded from 1.0 to 2.0, and the maximum character length is changed from 64 characters to 128 characters. If the function of the apparatus 100α complies with only the version 1.0, the apparatus 100α cannot properly use the attribute data 42 of the electronic mail address. In this case, the apparatus 100α compares the values of the versions with each other in the procedure described above. In accordance with the comparison result, the apparatus 100α informs the user of the unavailability of the attribute data 42 of the electronic mail address as shown in FIG. 24C (the shaded part in FIG. 24C).

Figure 25A:
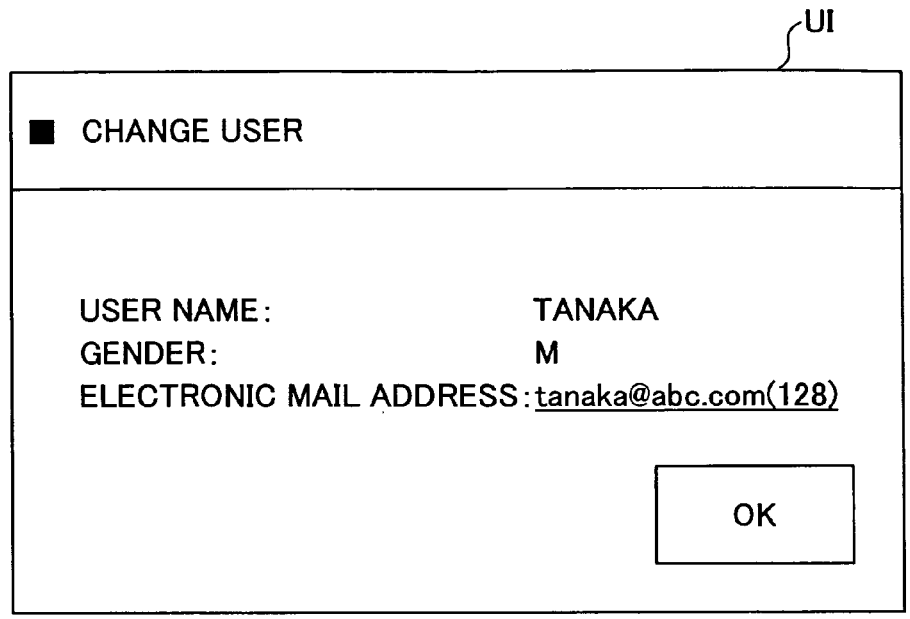
FIGS. 25A and 25B are diagrams showing an example (part 2) of the operations when the use limitations in the cooperation between the apparatuses according to the second embodiment of the present invention occur.
Figure 25B:
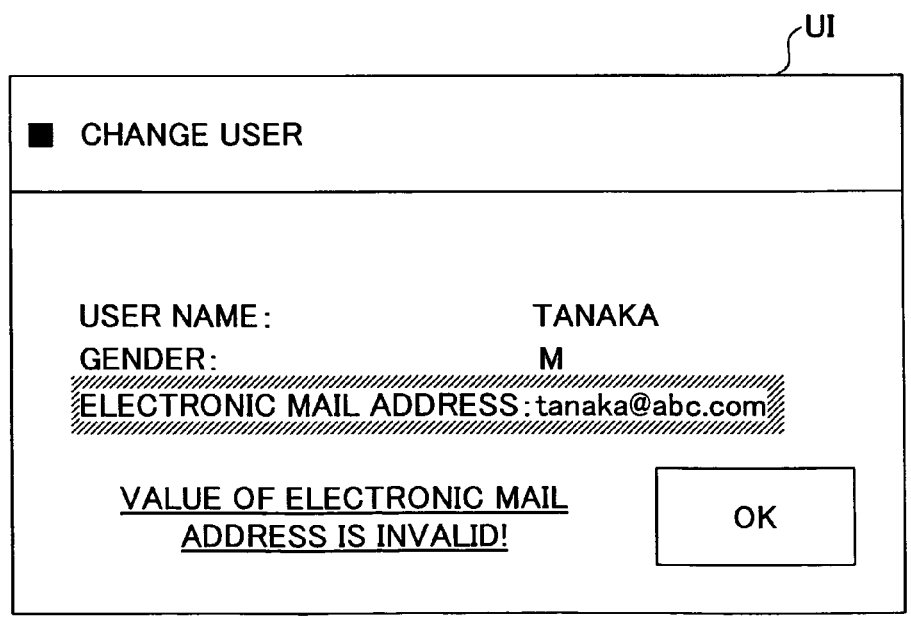

FIGS. 25A and 25B are diagrams showing an example (part 2) of the operations when the use limitations in the cooperation between the apparatuses according to the second embodiment of the present invention occur.

The user may edit the attribute data 42. In this case, determination is made as to whether data input during the editing complies with the data specifications (forbidden characters, maximum character length, etc.) of the attribute data 42. After this determination, the editing of the data is permitted. Here, the data specifications of the attribute data 42 are determined by the attribute construction unit 32 that constructs the attribute data 42.

For example, when the attribute construction unit 32 that constructs the attribute data 42 of the electronic mail address of the apparatus 100β returns invalid local flags to the information generation unit 22 of the apparatus 100α, the attribute construction unit 32 of the apparatus 100β can be operated by the apparatus 100α as shown in FIG. 25A. Therefore, the electronic mail address can be changed in accordance with the data specifications of the apparatus 100β. However, when the attribute construction unit 32 returns valid local flags to the information generation unit 22, the attribute construction unit 32 of the apparatus 100β cannot be operated by the apparatus 100α. Therefore, the electronic mail address is changed in accordance with the data specifications of the apparatus 100α. Accordingly, if there is any error in the data specifications, a message indicating the invalidity of the data is displayed as shown in FIG. 25B.

(Use Limitation Processing: Part 2)

FIG. 26 is a diagram showing an example (part 2) of a processing procedure for the use limitations in the cooperation between the apparatuses according to the second embodiment of the present invention. A description is made of processing for determining whether data complies with the data specifications of the attribute data 42 as described above and permitting the data operations.

When the apparatus 100α receives through the view 21 a request for confirming the specifications of the attribute data 42 to be used from the function U (step S901), the view 21 accesses the attribute data 42 and requests for the confirmation of the data specifications (step S902). The attribute data 42 confirm the data specifications in accordance with the request (step S903) and return the confirmation result to the view 21 (step S904).

The view 21 passes the confirmation result to the function U (step S905), and the function U determines whether the data specifications can be used based on the confirmation result (step S906).

As described above, the information processing apparatus 100 according to this embodiment confirms the data specifications of the information to be used even at the time of editing the information, thereby preventing the unexpected action of the functions due to a difference in the data specifications and prompting the prohibition of using the data specifications.

(Post-Processing at Logout Time)

The apparatus 100α introduces the attribute construction unit 32 of the apparatus 100β into itself at login time. In this case, at the logout time, the apparatus 100α is required to abandon the attribute construction units 32 introduced into itself (abandon software components read in the memory) from the viewpoint of effectively using the resources of the storage unit.

Next, a description is made of post-processing when the apparatus 100α logs out of the apparatus 100β connected for remote operations.

FIG. 27 is a diagram showing an example of the post-processing performed at the logout time according to the second embodiment of the present invention.

When receiving a logout request from the user through a session management SM (step S1001), the apparatus 100α passes the received logout instructions to the information generation unit 22 (step S1002).

In accordance with the logout instructions, the information generation unit 22 abandons the respective attribute construction units 32 acquired and introduced from the apparatus 100β based on the list of the attribute units (step S1003).

As described above, in the information processing apparatus 100 according to this embodiment, the software components that construct the attribute data 42 acquired from another apparatus 100 are abandoned at the logout time. Accordingly, the information processing apparatus 100 can avoid problems of security as a result of not leaving tracks (connection histories) connected to the apparatus 100α or the apparatus 100β by the cooperation between the apparatuses. In addition, the information processing apparatus 100 is not required to secure an extra storage region for holding the software components related to the generation of information in cases other than the cooperation between the apparatuses. In other words, the information processing apparatus 100 can effectively use hardware resources in other processing without restricting a squeeze on the capacity of the storage unit.

(Summary)

As described above, when remotely operating the apparatus 100β through the apparatus 100α, the information processing apparatus 100 according to the second embodiment of the present invention causes the apparatus 100α to temporarily operate the mechanism (information generation logic of the apparatus 100β) for generating information to be operated only at the login time (during remote operations). If the mechanism (information generation logic of the apparatus 100β) for generating the information cannot be operated by the apparatus 100α (if there are prescribed conditions such as security), the mechanism (information generation logic of the apparatus 100α) for generating information of the apparatus 100α is used. Furthermore, the data specifications of information to be used are confirmed before the information is provided by the apparatus 100α or the apparatus 100β, thereby preventing the unexpected action of the functions due to a difference in the data specifications and performing the use limitations of the functions in advance.

Accordingly, even in the cooperation between the apparatuses in the system in which the plural apparatuses 100α and the apparatuses 100β can be remotely operated through an electrical communications line such as the network 90, the information processing apparatus 100 can flexibly deal with an increase and decrease in the attribute data 42 constituting all sorts of information handled in the apparatus caused by the function expansion without changing the software components of the apparatus.

Third Embodiment

A problem assumed to be caused by adopting a configuration for flexibly dealing with an increase and decrease in the attribute data 42 constituting all sorts of information handled in the apparatus is processing time required for performing data operations.

Generally, when the function U performs the data operations of information through the view 21, access control is made so as to prevent the leakage and falsification of the information due to unauthorized accesses (i.e., to secure the confidentiality of the information).

In the access control, ACL (Access Control) is set for each of the attribute data 42 to determine whether the user is allowed to perform reading from and writing in the attribute, and it is performed on an attribute-by-attribute basis as the constituent of the information. Therefore, in the view 21 (function that provides information constituted of the plural attribute data 42) of the information processing apparatus 100 that can manage and operate theoretically infinite number of the attribute data 42, processing time is required until the function as a request source performs the data operations after receiving a request for performing the data operations. As a result, waiting time is caused at the time of the data operations, which may adversely affect user's sense of use.

In view of this, this embodiment provides the information processing apparatus 100 that solves the above problem, flexibly deals with an increase and decrease in the attribute data 42 constituting all sorts of information handled in the apparatus, and achieves the speed-up in access control processing performed on all sorts of information to be operated.

Specifically, one or more of the attribute data 42 are grouped into prescribed categories and the access control to the attribute data 42 are performed on a category-by-category basis, thereby reducing the processing time required for performing the access control.

In this manner, the information processing apparatus 100 according to this embodiment solves the above problem on the processing time required for performing the data operations.

Next, the information processing apparatus 100 according to this embodiment is described in detail.

(Information Processing Function)

The information processing apparatus 100 according to this embodiment has the view (information provision unit) 21 and the information management unit 22 as the main information processing functions and is configured to provide the function U that uses information with the persistent data D of all sorts of information of the apparatus. Note that the configuration of the information processing apparatus according to this embodiment is the same as that of the information processing apparatus according to the above embodiments, and descriptions thereof are thus omitted here.

(Mechanism for Operating (Generating/Adding/Deleting) Attribute Data)

In the information processing apparatus 100 according to this embodiment as well, the information management unit 22 generates the attribute configuration of the latest information in the memory in accordance with generation instructions from the view 21. Therefore, as software components managed by the information management unit 22, the information generation unit 31 adds information to be handled in the apparatus, and the attribute construction unit 32 adds the attribute data 42 constituting the information. The information management unit 22 controls these software components, thereby flexibly generating the information.

The respective function units described above are software components and stored in the ROM 105 of the information processing apparatus 100. The function units are read in the RAM 106 and executed by the CPU 108. In this manner, the functions of the functions units are implemented.

This embodiment is different from the first embodiment in the following point.

(Category Definition of Information Generation Unit)

FIG. 28 is a diagram showing an example of data configuration of the information generation unit 31 according to a third embodiment of the present invention.

The control data of the information generation unit 31 according to this embodiment contains a "generated information name" that indicates the data of the information to be generated, a "list of construction units" that indicates the data of links to the respective attribute construction units constituting the attribute data 42 of the information, and information that defines categories for grouping one or more of the attribute data 42 (hereinafter referred to as "category definition information").

The category definition information has a data configuration in which information (for example, category data such as a "category name") for defining categories and one or more of the attribute data 42 that belong to the categories are associated with each other.

For example, as shown in FIG. 28, category definition information defines a category "basic" that is associated with and groups the four attribute data 42 of an ID, a user name, a gender, and a password (to which the four attribute data 42 belong) and a category "FAX" that is associated with and groups the two attribute data 42 of a FAX number and a communications standard (to which the two attribute data 42 belong).

(Relationship between Categories and Attributes)

Figure 29A:

FIGS. 29A and 29B are diagrams showing a relationship between the categories and the attributes according to the third embodiment of the present invention. As shown in FIG. 29A, one or more of the attribute data 42 can be associated with each other in one category. However, the attribute data 42 do not necessarily belong to a prescribed category. In this case, the access control (access control to the attribute data 42 that do not belong to any category) is made in a typical manner.

Furthermore, the unit of the category is not necessarily the same as that of the plug-in 30. For example, as shown in FIG. 28, the category "basic" can be defined with respect to the attribute data 42b (password) added by the authentication attribute construction unit 32b that is introduced with the installation of the plug-in 30 related to authentication. That is, the category can be arbitrarily defined regardless of the unit of the function expansion of the plug-in 30.

The category is added to information generated by the information generation unit 31. Specifically, when the respective attribute construction units 32 generate information to which the attribute data 42 are added, the information generation unit 31 adds the category data, which are defined so as to be associated with the attribute data 42, so as to be associated with the corresponding attribute data 42 based on the category definition information of its own. For example, FIG. 29B shows a case in which the user information generation unit 31a adds the category data 43 of the category names "basic" and "FAX" to the generated user information 41u based on the category definition information shown in FIG. 28.

(Category Addition Processing)

Next, taking the user information 41u handled in the apparatus as an example, a description is made of processing for adding the category with the information generation unit 31.

(Data Operations of User Information)

FIG. 30 is a diagram showing an example of a processing procedure in which the category data 43 are added to the user information 41u according to the third embodiment of the present invention. Note that the processing procedure from steps S1101 through S1109 shown in FIG. 30 is the same as that from steps S501 through S509 shown in FIG. 12, and descriptions thereof are thus omitted here. The processing procedure after step S1110 is described below.

When the user information generation unit 31u receives the latest user information 41u completed as added with the FAX attribute from the FAX attribute construction unit 32c at the last place in the list of the construction units, it reads the category definition information of its own (step S1110). Then, based on the contents of the read definition, the user information generation unit 31u adds the category data 43 indicating a defined category name to the user information 41u so as to be associated with the corresponding attribute data 42 (step S1111).

As a result, the user information generation unit 31u passes the user information 41u, to which the category is added and which is completed on the memory, to the information management unit 22 that has issued the generation instructions (step S1112). Then, the user information 41u is passed from the information management unit 22 to the function U that uses the user information 41u (step S1113).

(State Transition of Data Configuration in Processing Step at Data Operations)

Figure 31:
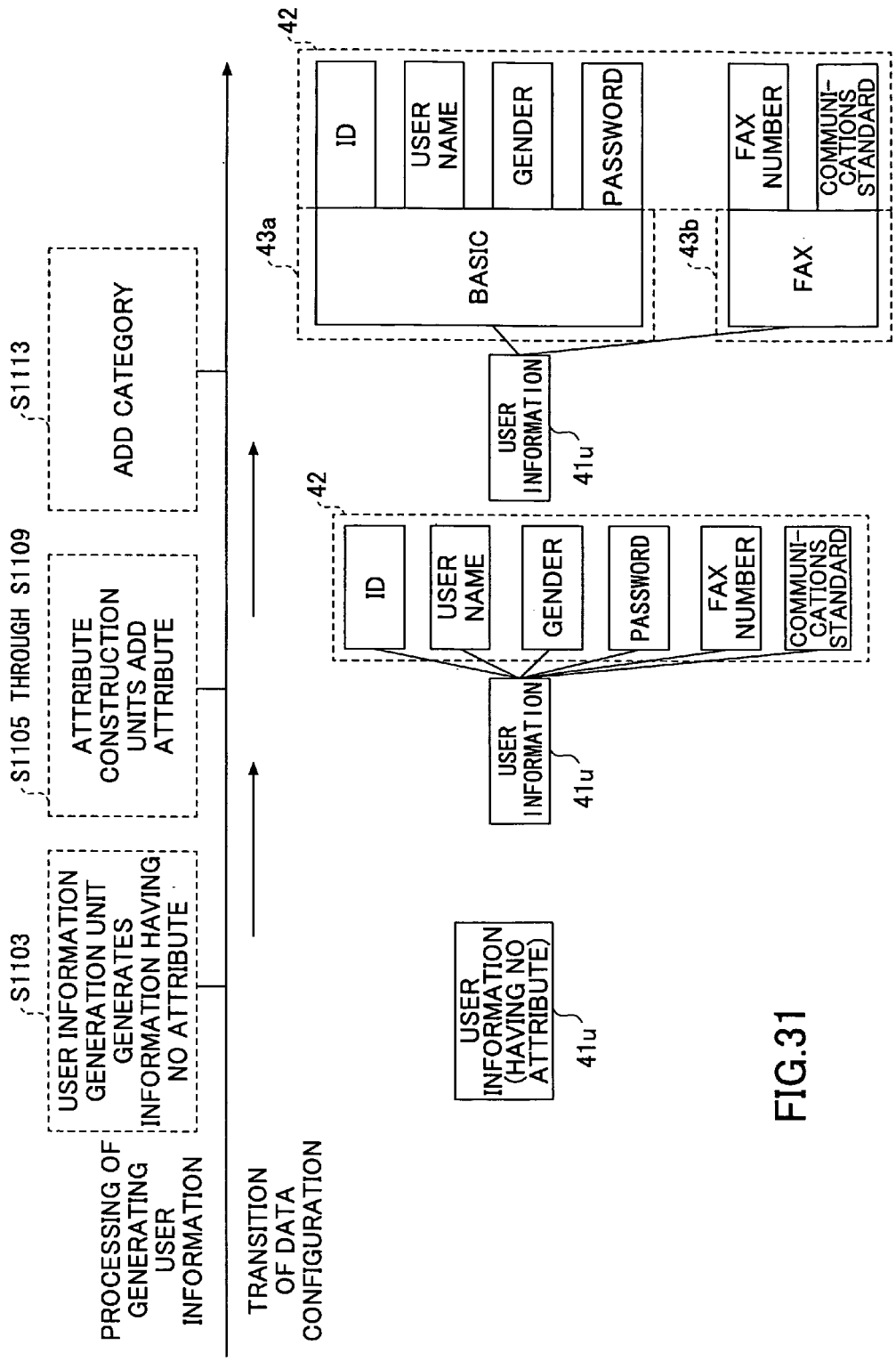
FIG. 31 is a diagram showing an example of operations when category data are added to user information according to the third embodiment of the present invention.

FIG. 31 is a diagram showing an example of operations when the category data 43 are added to the user information 41u according to the third embodiment of the present invention. Together with a corresponding processing procedure, a description is made of the transition of the data configuration when the category is added to the user information 41u in accordance with the processing procedure described using FIG. 30.

As shown in FIG. 31, when step S1103 is performed, the prescribed storage region is assured in the memory and the user information 41u having no attribute is generated. Next, when the processing procedure from steps S1105 through S1109 is performed, the attribute data 42 of an ID, a user name, a gender, a password, a FAX number, a communications standard are added to the user information 41u generated in the memory. Then, when step S1113 is performed, the category data 43a and 43b of the associated category names "basic" and "FAX" are added to the attribute data 42 constituting the user information 41u.

As described above, in the information processing apparatus 100 according to this embodiment, one or more of the attribute data 42 constituting information are grouped into the prescribed (defined) categories. Accordingly, the information processing apparatus 100 performs the processing related to the access control for operating the attribute data 42 on a category-by-category basis, not on an attribute-by-attribute basis.

(Processing for Access Control at Data Operations)

Next, taking the data operations for the user information 41u handled in the apparatus, a description is made of processing for the access control when the attribute data 42 are acquired through the view 21.

Figure 32:
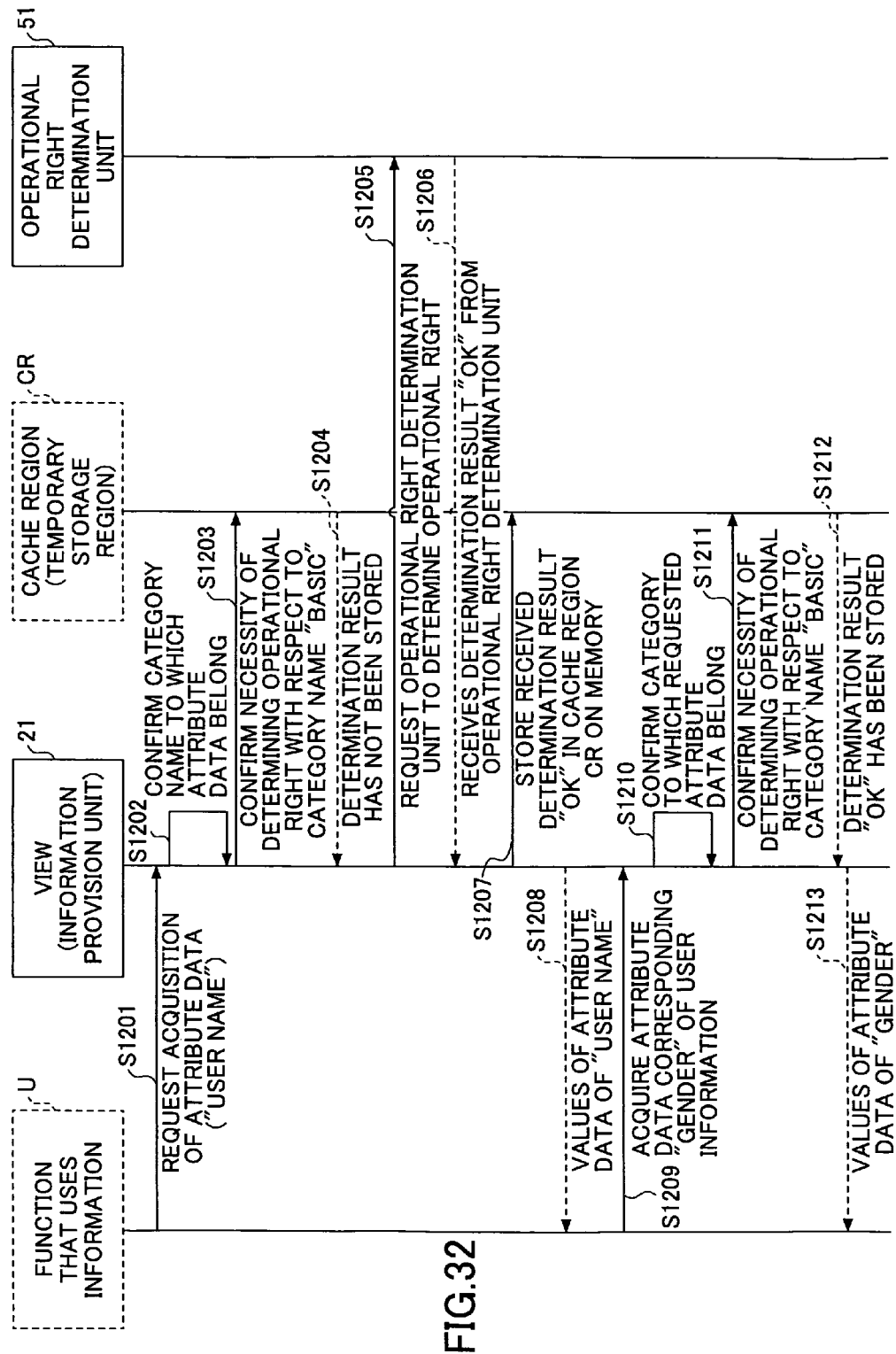
FIG. 32 is a diagram showing an example of a processing procedure for access control according to the third embodiment of the present invention.

FIG. 32 is a diagram showing an example of the processing procedure for the access control according to the third embodiment of the present invention.

When the information processing apparatus 100 is requested by the function U to acquire the attribute data 42 corresponding to the "user name" of the user information 41u, it receives the request through the view 21 (step S1201).

The view 21 first confirms the category to which the requested attribute data 42 belong (step S1202). The category is confirmed in such a manner that the category data 43 associated with the attribute data 42 of the "user name" are referred to in the user information 41u.

Then, when it is confirmed that the requested attribute data 42 belong to the category "basic" (when the category data 43 can be referred to), the view 21 confirms the necessity of determining an operational right (necessity of performing the access control) with respect to the confirmed category (step S1203). The necessity of determining the operational right is confirmed in such a manner that the prescribed storage region in the memory is referred to.

The determination of the operational right is performed on a category-by-category basis, and the determination result is stored in a cache region CR as a temporary storage region in the memory. Thus, the view 21 can confirm whether the determination of the operational right with respect to the category has been made by referring to the determination result stored in the cache region CR in the memory.

When it is determined that the determination result has not been stored in the cache region CR and the determination of the operational right has not been performed with respect to the category "basic" after referring to the cache region CR on the memory and confirming the necessity of determining the operational right (step S1204), the view 21 requests an operational right determination unit 51 to determine the operational right (access right) (step S1205).

When the view 21 receives the determination result "OK" from the operational right determination unit 51 (step S1206), it stores the received determination result in the cache region CR on the memory so as to be associated with the category that had made the determination (step S1207).

Then, the view 21 acquires the values of the attribute data 42 of the "user name" from the user information 41u in accordance with the determination result of the operational right and passes the acquired value to the function U as an acquisition request source (step S1208).

Furthermore, when the view 21 is requested by the function U to acquire the attribute data 42 corresponding the "gender" of the user information 41u (step S1209), it confirms the category to which the requested attribute data 42 belong in the same manner as the processing procedure in step S1202 (step S1210). When it is confirmed that the attribute data 42 belong to the category "basic," the view 21 confirms the necessity of determining the operational right with respect to the confirmed category (step S1211).

When it is determined that the determination result has been stored in the cache region CR and the determination of the operational right has been performed with respect to the category "basic" after referring to the cache region CR on the memory and confirming the necessity of determining the operational right (step S1212), the view 21 does not request the operational right determination unit 51 to determine the operational right (access right). In accordance with the determination result of the operational right, the view 21 acquires the values of the attribute data 42 of the "gender" from the user information 41u and passes the acquired values to the function U (step S1213).

As described above, in the information processing apparatus 100 according to this embodiment, in the access control at the data operations, the determination result as to the operational right, which is performed with respect to the category to which the attribute data 42 to be operated belong, is temporarily stored.

Accordingly, in the following access control, the determination result as to the operational right with respect to the category can be confirmed by referring to the cache region CR. Therefore, when the attribute data 42 that belong to the same category are operated, it is not necessary to request for the determination of the operational right for each of the attribute data 42.

(Summary)

As described above, the information processing apparatus 100 according to the third embodiment of the present invention has a configuration in which the attribute construction unit 32 (attribute construction module) that performs the data operations such as addition/deletion/change of the attribute data 42 is added in and deleted from the apparatus in accordance with the installation/uninstallation of the plug-in 30 that performs the function expansion. In the information processing apparatus 100, based on the list of the construction units as the control data registered at the time of installation, the information generation unit 31 specifies the attribute construction unit 32 that performs the data operations of the instructed attribute data 42 from among the installed attribute construction units 32. As a result, the attribute data 42 are operated by the specified attribute construction unit 32. Furthermore, in the data operations, instead of accessing the persistent region such as the HDD 110 and directly performing the data operations, information to be operated is first generated in the memory and the requested data operations are performed on the generated information, thereby adding/deleting/changing the attribute data 42 in a pseudo manner.

Furthermore, at the time of generating information, the information generation unit 31 adds the category data 43 indicating the defined category name to the generated information so as to be associated with the corresponding attribute data 42 based on the category definition information in which the categories for grouping one or more of the attribute data 42 as the control data are defined.

Accordingly, the information processing apparatus 100 flexibly deals with an increase and decrease in the attribute data 42 that constitute all sorts of information handled in the apparatus and performs the processing on a category-by-category basis in the access control that is performed on information to be operated. In addition, the information processing apparatus 100 stores the determination result of the operational right once obtained in the memory. Therefore, when operating the attribute data 42 that belong to the same category, the information processing apparatus 100 is not required to determine the operational right again by referring to the stored determination result. As a result, access limitation processing can be accelerated (processing time for the access control can be reduced).

As described above, the present invention is described based on the respective embodiments. However, the "information processing function" of the information processing apparatus 100 according to the embodiments can be implemented in such a manner that the above processing procedure is performed on the computer as a program coded by a programming language suitable for an operational circumstance (platform) of the controller 13. Accordingly, the information processing program and the plug-in 30 (function expansion program) according to the embodiments can be stored in the recording medium capable of being read by the computer.

The information processing program and the plug-in 30 according to the embodiments are stored in the recording medium 104 such as a floppy disk (Registered Trademark), a CD (Compact Disc), and a DVD (Digital Versatile Disk). Thus, the information processing program and the plug-in 30 can be installed in the information processing apparatus 100 through the drive unit 103 capable of reading the recording medium 104. Furthermore, the information processing apparatus 100 has the data communications I/F 14 capable of being connected to a data transmission path such as the network 90. Therefore, the information processing apparatus 100 can download and install the information processing program and the plug-in 30 by using an electrical communications line such as the Internet.

The present invention is not limited to the specifically disclosed embodiments, and variations and modifications may be made without departing from the scope of the present invention.

The present application is based on Japanese Priority Applications No. 2008-036268 filed on Feb. 18, 2008, and No. 2008-273462 filed on Oct. 23, 2008, the entire contents of which are hereby incorporated herein by reference.

What is claimed is:

1. An information processing apparatus comprising:
a first memory configured to store attribute data of a user, the attribute data corresponding to at least one software program installed in the information processing apparatus, the at least one software program configuring the information processing apparatus to perform a facsimile operation and the attribute data corresponding to the software program including at least a facsimile number associated with the user;
a second memory configured to store control data, the control data corresponding to at least one of the software programs installed in the information processing apparatus; and
a processor and associated memo storing computer readable code that, when executed by the processor, configures the processor as,
a first update unit configured to update the control data stored in the second memory when installing or uninstalling at least one of the software programs in the information processing apparatus such that the attribute data of the user is unmodified when installing or uninstalling the at least one of the software program,
an update receiving unit configured to receive an update request of the attribute data, and
a second update unit configured to update the attribute data of the user based on the control data in response to the update request such that the attribute data is only updated in response to the update request and not updated when the first update unit updates the control data stored in the second memory.

2. The information processing apparatus according to claim 1, wherein the first update unit updates the control data based on a function of each of the software programs installed in the information processing apparatus.

3. The information processing apparatus according to claim 1, wherein the first update unit is configured to update the control data by adding or deleting information items thereto,
the second update unit is configured to update the attribute data by adding or deleting information items thereto such that when a new attribute of the user is added to the attribute data the second update unit sets the information items corresponding thereto as a predetermined value.

4. An information processing method of an information processing apparatus, the information processing method comprising:
storing, in a first memory, attribute data of a user, the attribute data corresponding to at least one software program installed in the information processing apparatus, the at least one software program configuring the information processing apparatus to perform a facsimile operation and the attribute data corresponding to the software program including at least a facsimile number associated with the user;
storing, in a second memory, control data, the control data corresponding to at least one of the software programs installed in the information processing apparatus;
updating, by a first update unit, the control data stored in the second memory when installing or uninstalling at least one of the software programs in the information processing apparatus such that the attribute data of the user is unmodified when installing or uninstalling the at least one of the software programs;

receiving, by an update receiving unit, an update request of the attribute data;

updating, by a second update unit, the attribute data based on the control data unit in response to the update request such that the attribute data is only updated in response to the update request and not updated when the first update unit updates the control data stored in the second memory.

5. The information processing method according to claim 4, wherein the first update unit updates the control data based on a function of each of the software programs installed in the information processing apparatus.

6. The information processing method according to claim 4, wherein the updating of the control data by the first update unit includes adding or deleting information items thereto, the updating of the attribute data by the second update unit includes adding or deleting information items thereto such that when a new attribute of the user is added to the attribute data the information items corresponding thereto are set as a predetermined value.

7. A non-transitory computer-readable recording medium storing a program, wherein execution of the program by one or more processors in an information processing apparatus causes the one or more processors to perform the steps of:

storing, in a first memory, attribute data of a user, the attribute data corresponding to at least one software program installed in the information processing apparatus, the at least one software program configuring the information processing apparatus to perform a facsimile operation and the attribute data corresponding to the software program including at least a facsimile number associated with the user;

storing, in a second memory, control data, the control data corresponding to at least one of the software programs installed in the information processing apparatus;

updating, by a first update unit, the control data stored in the second memory when installing or uninstalling at least one of the software programs in the information processing apparatus such that the attribute data of the user is unmodified when installing or uninstalling the at least one of the software programs;

receiving, by an update receiving unit, an update request of the attribute data; and updating, by a second update unit, the attribute data based on the control data in response to the update request such that the attribute data is only updated in response to the update request and not updated when the first update unit updates the control data stored in the second memory.

8. The non-transitory computer-readable recording medium according to claim 7, wherein the first update unit updates the control data based on a function of each of the software programs installed in the information processing apparatus.

9. The non-transitory computer-readable recording medium according to claim 7, wherein the updating of the control data by the first update unit includes adding or deleting information items thereto, the updating of the attribute data by the second update unit includes adding or deleting information items thereto such that when a new attribute of the user is added to the attribute data the information items corresponding thereto are set as a predetermined value.

\* \* \* \* \*